(12) United States Patent
Pendleton et al.

(10) Patent No.: US 11,987,249 B2
(45) Date of Patent: May 21, 2024

(54) PRECEDENCE DETERMINATION AT MULTI-WAY STOPS

(71) Applicant: Motional AD LLC, Boston, MA (US)

(72) Inventors: Scott D. Pendleton, Singapore (SG); Xiaojun Sun, Pittsburgh, PA (US); Shu-Kai Lin, Pittsburgh, PA (US); Puneet Singhal, Pittsburgh, PA (US); Yu Pan, Singapore (SG); Lubing Zhou, Singapore (SG); Laith Sahawneh, Murrysville, PA (US); Guchan Ozbilgin, Pittsburgh, PA (US); Giancarlo Baldan, Somerville, MA (US)

(73) Assignee: Motional AD LLC, Boston, MA (US)

( * ) Notice: Subject to any disclaimer, the term of this patent is extended or adjusted under 35 U.S.C. 154(b) by 89 days.

(21) Appl. No.: 17/583,769

(22) Filed: Jan. 25, 2022

(65) Prior Publication Data

US 2023/0192090 A1 Jun. 22, 2023

Related U.S. Application Data

(60) Provisional application No. 63/292,850, filed on Dec. 22, 2021.

(51) Int. Cl.
*B60W 30/18* (2012.01)
(52) U.S. Cl.
CPC .............. *B60W 30/18159* (2020.02); *B60W 30/18063* (2013.01); *B60W 30/181* (2013.01);
(Continued)
(58) Field of Classification Search
CPC ..... B60W 30/18159; B60W 30/18063; B60W 30/181; B60W 30/18154;
(Continued)

(56) References Cited

U.S. PATENT DOCUMENTS

2017/0249836 A1 8/2017 Laur et al.
2020/0103523 A1 4/2020 Liu et al.
(Continued)

FOREIGN PATENT DOCUMENTS

KR 10-2014-0011247 1/2024
WO WO 2021/030476 2/2021

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

*Primary Examiner* — Adam R Mott
*Assistant Examiner* — Erick T. Detweiler
(74) *Attorney, Agent, or Firm* — Fish & Richardson P.C.

(57) ABSTRACT

Among other things, techniques are described for determining precedence order at a multiway stop. In embodiments, identifications are assigned to tracks, and young tracks are compared to stale tracks. A young track matches a stale track based on one or more factors. An identification of the young track is reassigned to an identification of the stale track, wherein the young track is determined to match the stale track based on the one or more factors. An earliest time of appearance of agents is determined based on identifications and in view of perception obscured areas. A precedence order for navigating through the intersection is determined based on local rules, the identifications, and the earliest time of appearance of agents, and the vehicle proceeds through the multiway stop intersection in accordance with the precedence order.

19 Claims, 23 Drawing Sheets

(52) U.S. Cl.
CPC ............... *B60W 30/18154* (2013.01); *B60W 2554/4041* (2020.02); *B60W 2554/4045* (2020.02); *B60W 2555/60* (2020.02)

(58) Field of Classification Search
CPC . B60W 2554/4041; B60W 2554/4045; B60W 2555/60; B60W 60/001; B60W 2554/4048; G05D 1/0289
See application file for complete search history.

(56) References Cited

U.S. PATENT DOCUMENTS

| | | | |
|---|---|---|---|
| 2020/0346666 A1* | 11/2020 | Wray | G01C 21/3407 |
| 2020/0377101 A1 | 12/2020 | Parasuram et al. | |
| 2021/0061269 A1* | 3/2021 | Petroff | B60W 60/0027 |
| 2021/0339747 A1 | 11/2021 | Parasuram et al. | |

* cited by examiner

PRECEDENCE DETERMINATION AT MULTI-WAY STOPS

CROSS REFERENCE TO RELATED APPLICATIONS

This application claims priority to U.S. Provisional Application No. 63/292,850, filed Dec. 22, 2021, the entire contents of each of which are incorporated herein by reference.

FIELD OF THE INVENTION

This description relates to precedence determination. More specifically, the present techniques relate to a precedence determination at multi-way stops.

BACKGROUND

Autonomous vehicles can be used to transport people and/or cargo (e.g., packages, objects, or other items) from one location to another. For example, an autonomous vehicle can navigate to the location of a person, wait for the person to board the autonomous vehicle, and navigate to a specified destination (e.g., a location selected by the person). To navigate in the environment, these autonomous vehicles are equipped with various types of sensors to detect objects in the surroundings.

DETAILED DESCRIPTION

Figure 1:
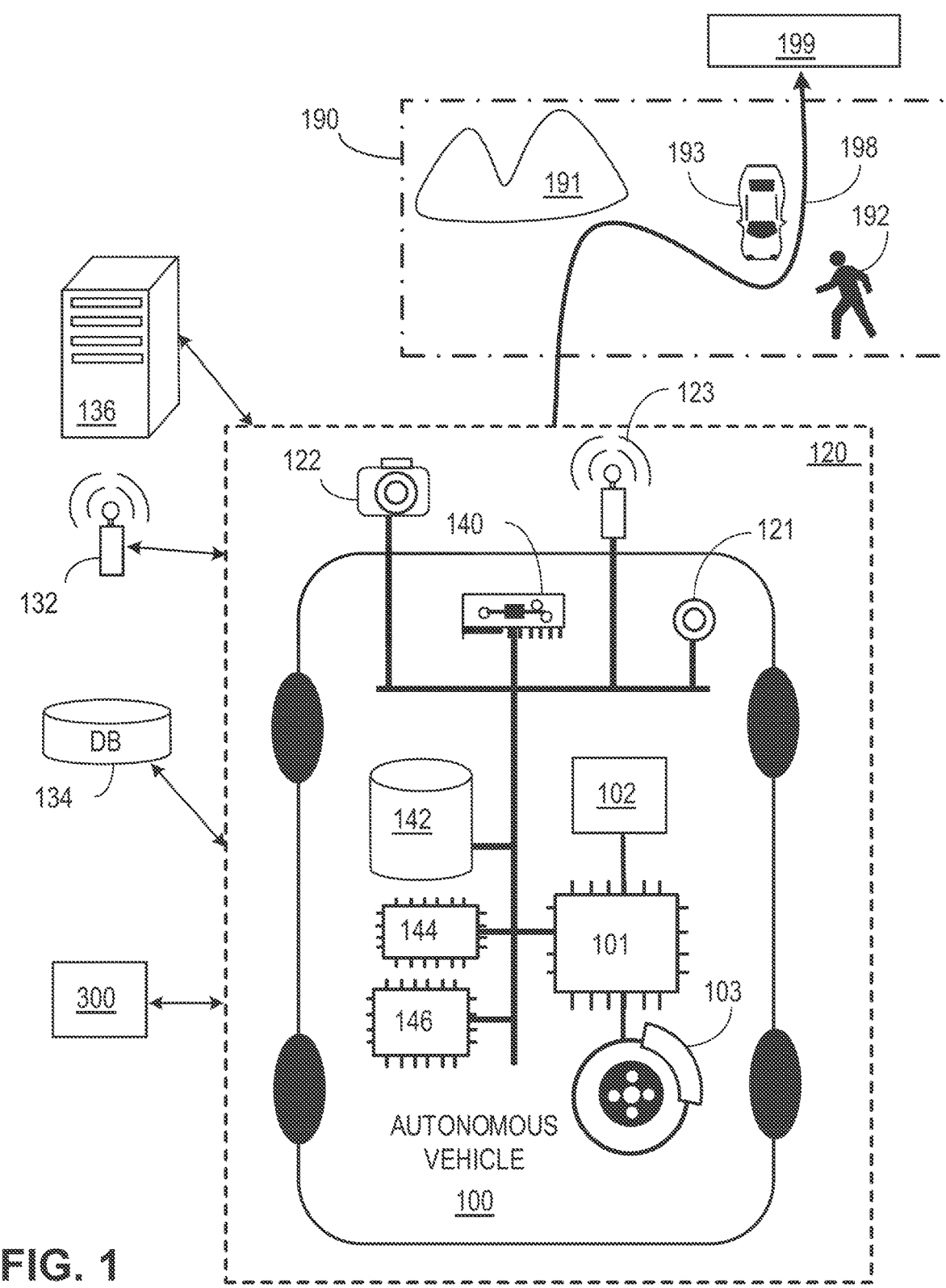
FIG. 1 shows an example of an autonomous vehicle (AV) having autonomous capability.

In the following description, for the purposes of explanation, numerous specific details are set forth in order to provide a thorough understanding of the present disclosure. It will be apparent, however, that the present disclosure can be practiced without these specific details. In other instances, well-known structures and devices are shown in block diagram form in order to avoid unnecessarily obscuring the present disclosure.

In the drawings, specific arrangements or orderings of schematic elements, such as those representing devices, modules, systems, instruction blocks, and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. AV Architecture

4. AV Inputs
5. AV Planning
6. AV Control
7. Precedence Determination
8. Identification after Previous Occlusion
9. Identification, Occlusion, and Re-Identification
10. Resolving Intermediate IDs
11. Unresolved Intermediate ID
12. Precedence Order with Rolling Stops
13. Process flow for Precedence Determination General Overview Navigation of a multiway stop includes a determination of the order in which agents arrive at the intersection. This order is referred to as the order of arrival. In the case of a multi-way stop, the order of arrival can dictate which agents have the right of way over other agents to proceed through the intersection, collectively expressed as a precedence order. Agents (e.g., vehicles, cyclists) at an intersection are perceived and tracking identifications (IDs) are assigned to new agents, while previously identified agents which drop (e.g., are no longer perceived) from perception are re-identified upon recovered perception. A precedence order may be derived based on, at least in part, the unique identification assigned to the agents. When a vehicle has a highest precedence, it is expected to proceed into the intersection before vehicles with a lower precedence, based on the local traffic regulations (e.g., where first in, first out (FIFO) regulation is applied as the highest order precedence determination rule, the first vehicle to arrive at the intersection would have right of way over the second to arrive, the second to arrive would have right of way over the third to arrive, and so on; other precedence determination rules may be applied either as tie breakers or as higher order determination rules overruling FIFO ordering depending on the locality's specification).

Some of the advantages of these techniques include minimizing the effect occlusions have on navigation through an intersection. Moreover, the present techniques can be applied to agents that do not fully stop at an intersection, such as vehicles that roll over the stop line at an intersection, or vehicles which stop at a point further forward than designated by infrastructure (painted line and/or stop sign location).

System Overview

FIG. 1 shows an example of a vehicle 100 having an autonomous capability.

As used herein, the term "autonomous capability" refers to a function, feature, or facility that enables a vehicle to be partially or fully operated without real-time human intervention, including without limitation fully AVs, highly AVs, and conditionally AVs.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully AVs, highly AVs, and conditionally AVs, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially AVs and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems can automate certain vehicle operations (e.g., steering, braking, and using maps) under certain operating conditions based on processing of sensor inputs. The technologies described in this document can benefit vehicles in any levels, ranging from fully AVs to human-operated vehicles.

AVs have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the vehicle 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the vehicle 100, such as the AV's position, linear and angular velocity and acceleration, and heading (e.g., an orientation of the leading end of vehicle 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the vehicle 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the vehicle 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among AVs.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication devices 140 transmit data collected from sensors 121 or other data related to the operation of vehicle 100 to the remotely located database 134. In an embodiment, communication devices 140 transmit information that relates to teleoperations to the vehicle 100. In some embodiments, the vehicle 100 communicates with other remote (e.g., "cloud") servers 136.

In an embodiment, the remotely located database 134 also stores and transmits digital data (e.g., storing data such as road and street locations). Such data is stored on the memory 144 on the vehicle 100, or transmitted to the vehicle 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data can be stored on the memory 144 on the vehicle 100, or transmitted to the vehicle 100 via a communications channel from the remotely located database 134.

Computer processors 146 located on the vehicle 100 algorithmically generate control actions based on both real-time sensor data and prior information, allowing the AV system 120 to execute its autonomous driving capabilities.

In an embodiment, the AV system 120 includes computer peripherals 132 coupled to computer processors 146 for providing information and alerts to, and receiving input from, a user (e.g., an occupant or a remote user) of the vehicle 100. In an embodiment, peripherals 132 are similar to the display 312, input device 314, and cursor controller 316 discussed below in reference to FIG. 3. The coupling is wireless or wired. Any two or more of the interface devices can be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
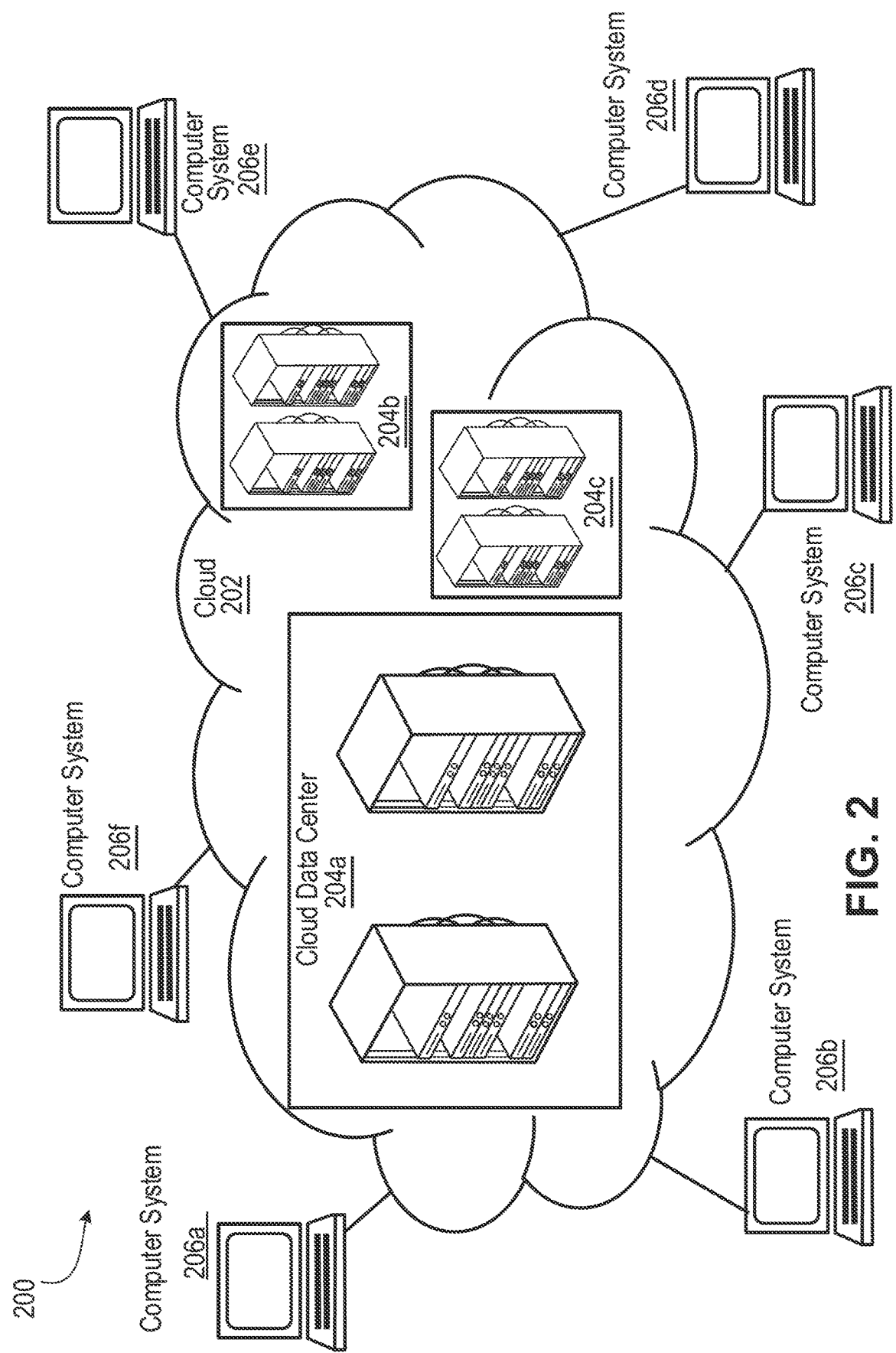
FIG. 2 shows an example "cloud" computing environment.

FIG. 2 shows an example of a "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementations, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, AVs (including, cars, drones, shuttles, trains, buses, etc.) and consumer electronics. In an embodiment, the computing systems 206a-f are implemented in or as a part of other systems.

Figure 3:
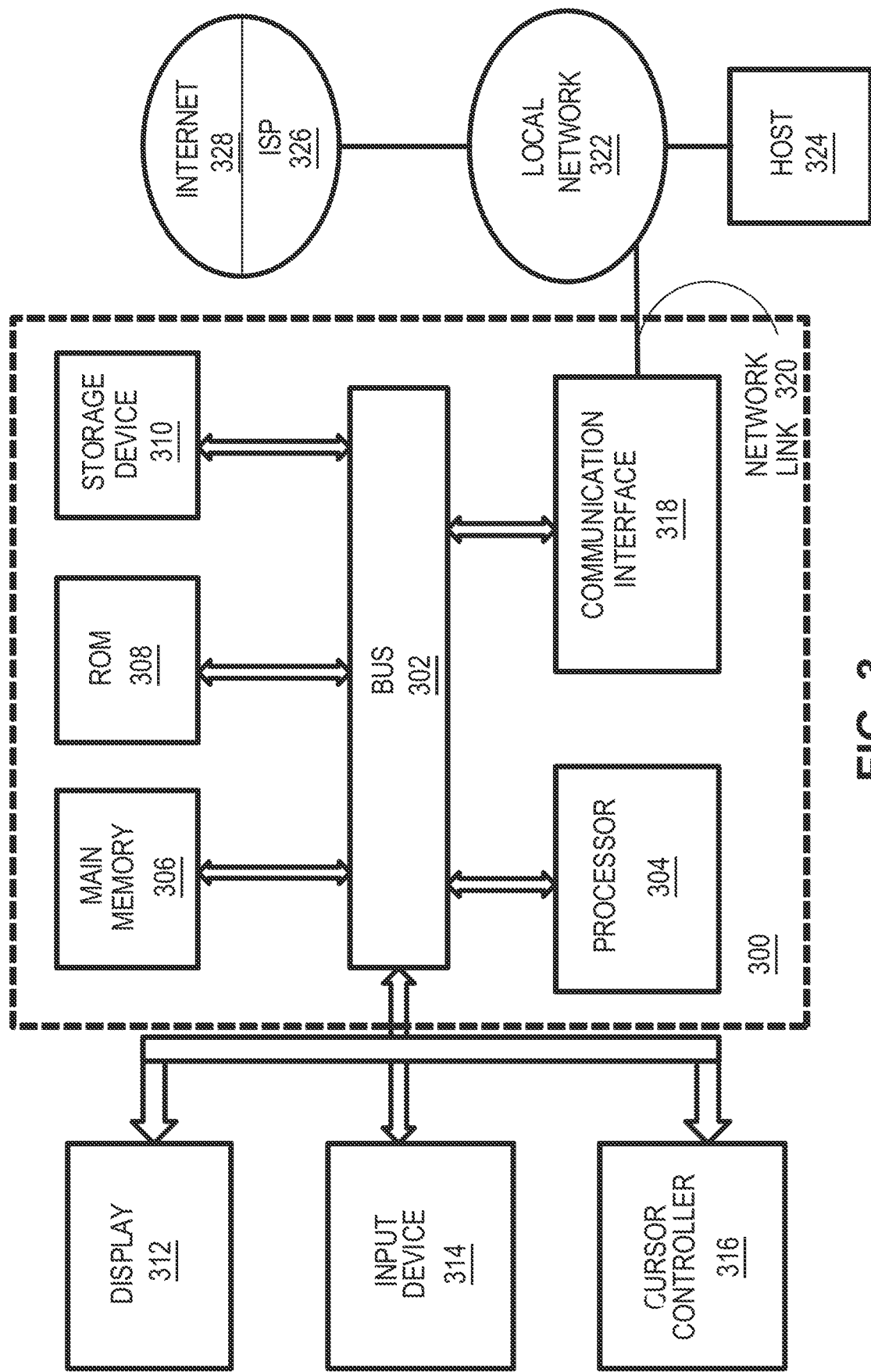
FIG. 3 shows a computer system.

FIG. 3 shows a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a processor 304 coupled with a bus 302 for processing information. The processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and sends the instructions over a telephone line using a modem. A modem local to the computer system 300 receives the data on the telephone line and uses an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 can optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

AV Architecture

Figure 4:
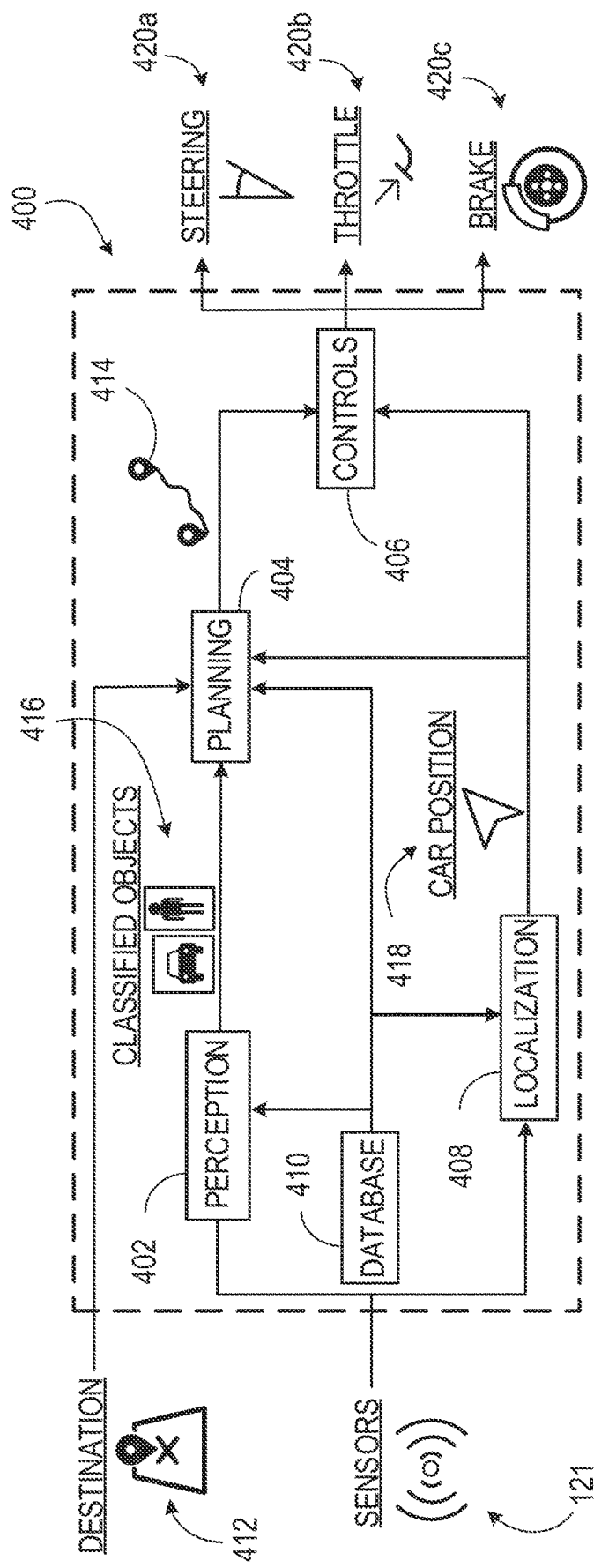
FIG. 4 shows an example architecture for an AV.

FIG. 4 shows an example architecture 400 for an AV (e.g., the vehicle 100 shown in FIG. 1). The architecture 400 includes a perception system 402 (sometimes referred to as a perception circuit), a planning system 404 (sometimes referred to as a planning circuit), a control system 406 (sometimes referred to as a control circuit), a localization system 408 (sometimes referred to as a localization circuit), and a database system 410 (sometimes referred to as a database circuit). Each system plays a role in the operation of the vehicle 100. Together, the systems 402, 404, 406, 408, and 410 can be part of the AV system 120 shown in FIG. 1. In some embodiments, any of the systems 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the systems 402, 404, 406, 408, and 410 is sometimes referred to as a processing circuit (e.g., computer hardware, computer software, or a combination of the two). A combination of any or all of the systems 402, 404, 406, 408, and 410 is also an example of a processing circuit.

In use, the planning system 404 receives data representing a destination 412 and determines data representing a trajectory 414 (sometimes referred to as a route) that can be traveled by the vehicle 100 to reach (e.g., arrive at) the destination 412. In order for the planning system 404 to determine the data representing the trajectory 414, the planning system 404 receives data from the perception system 402, the localization system 408, and the database system 410.

The perception system 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning system 404.

The planning system 404 also receives data representing the AV position 418 from the localization system 408. The localization system 408 determines the AV position by using data from the sensors 121 and data from the database system 410 (e.g., a geographic data) to calculate a position. For example, the localization system 408 uses data from a GNSS (Global Navigation Satellite System) sensor and geographic data to calculate a longitude and latitude of the AV. In an embodiment, data used by the localization system 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control system 406 receives the data representing the trajectory 414 and the data representing the AV position 418 and operates the control functions 420a-c (e.g., steering, throttling, braking, ignition) of the AV in a manner that will cause the vehicle 100 to travel the trajectory 414 to the destination 412. For example, if the trajectory 414 includes a left turn, the control system 406 will operate the control functions 420a-c in a manner such that the steering angle of the steering function will cause the vehicle 100 to turn left and the throttling and braking will cause the vehicle 100 to pause and wait for passing pedestrians or vehicles before the turn is made.

AV Inputs

Figure 5:
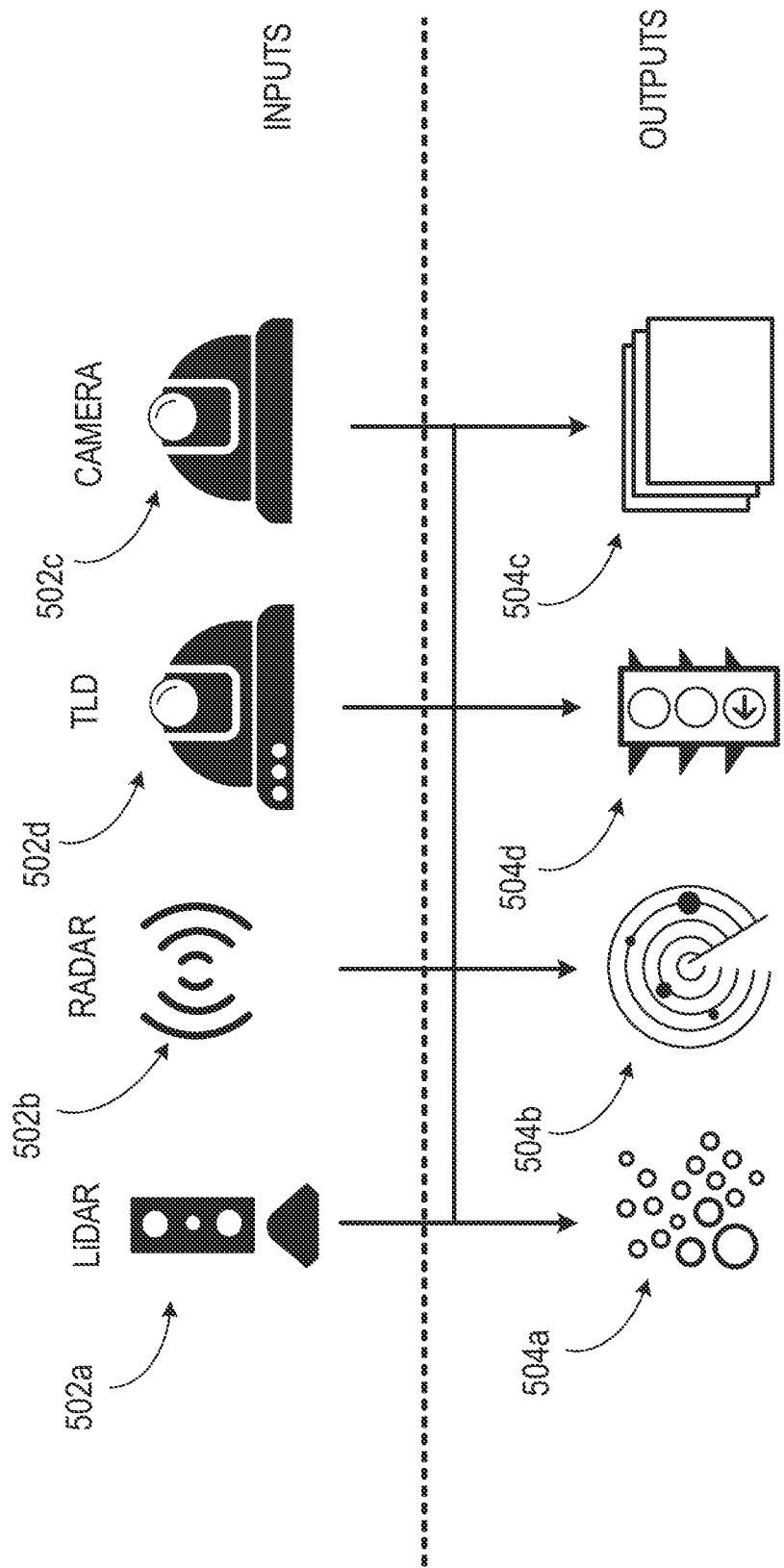
FIG. 5 shows an example of inputs and outputs that can be used by a perception system.

FIG. 5 shows an example of inputs 502a-d (e.g., sensors 121 shown in FIG. 1) and outputs 504a-d (e.g., sensor data) that is used by the perception system 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In some embodiments, the camera system is configured to "see" objects far, e.g., up to a kilometer or more ahead of the AV. Accordingly, in some embodiments, the camera system has features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the vehicle 100 has access to all relevant navigation information provided by these objects. For example, the viewing angle of the TLD system is about 120 degrees or more.

In some embodiments, outputs 504a-d are combined using a sensor fusion technique. Thus, either the individual outputs 504a-d are provided to other systems of the vehicle 100 (e.g., provided to a planning system 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
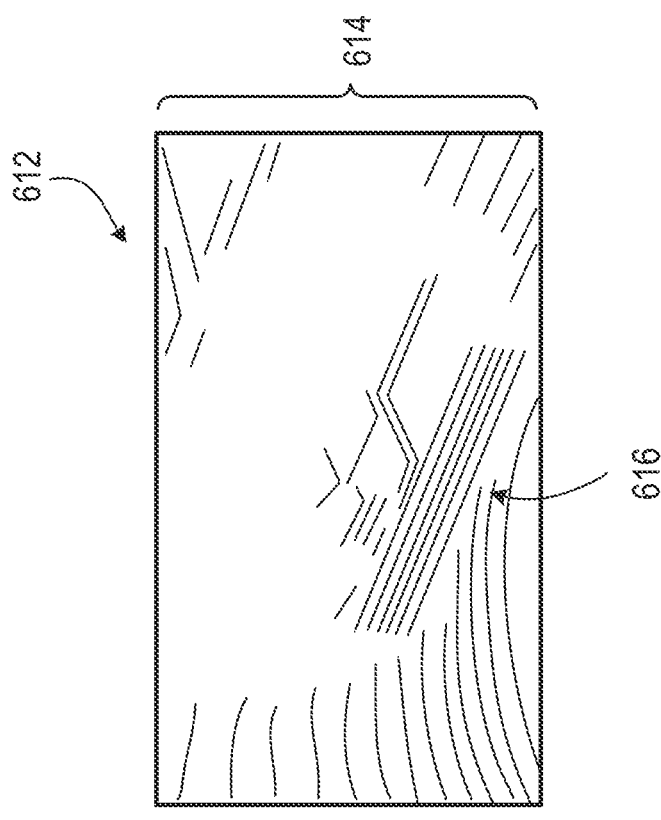
FIG. 6 shows an example of a LiDAR system.
Figure 6:
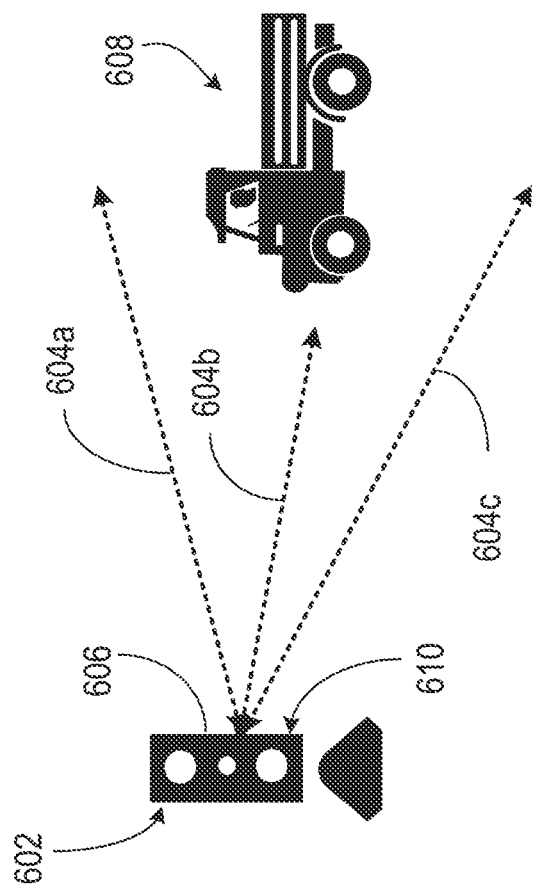

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
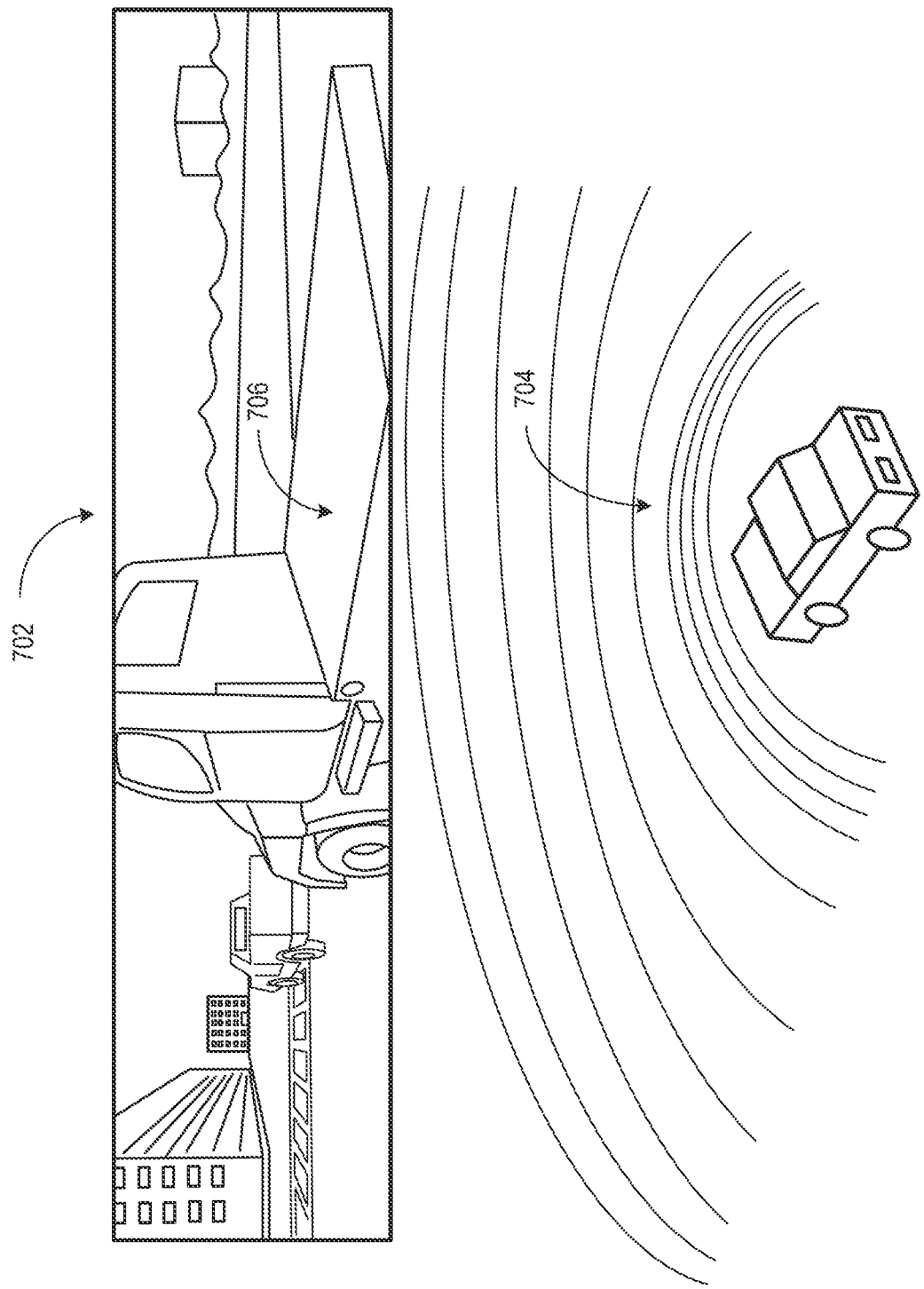
FIG. 7 shows the LiDAR system in operation.

FIG. 7 shows the LiDAR system 602 in operation. In the scenario shown in this Figure, the vehicle 100 receives both camera system output 504c in the form of an image 702 and LiDAR system output 504a in the form of LiDAR data points 704. In use, the data processing systems of the vehicle 100 compares the image 702 to the data points 704. In particular, a physical object 706 identified in the image 702 is also identified among the data points 704. In this way, the vehicle 100 perceives the boundaries of the physical object based on the contour and density of the data points 704.

Figure 8:
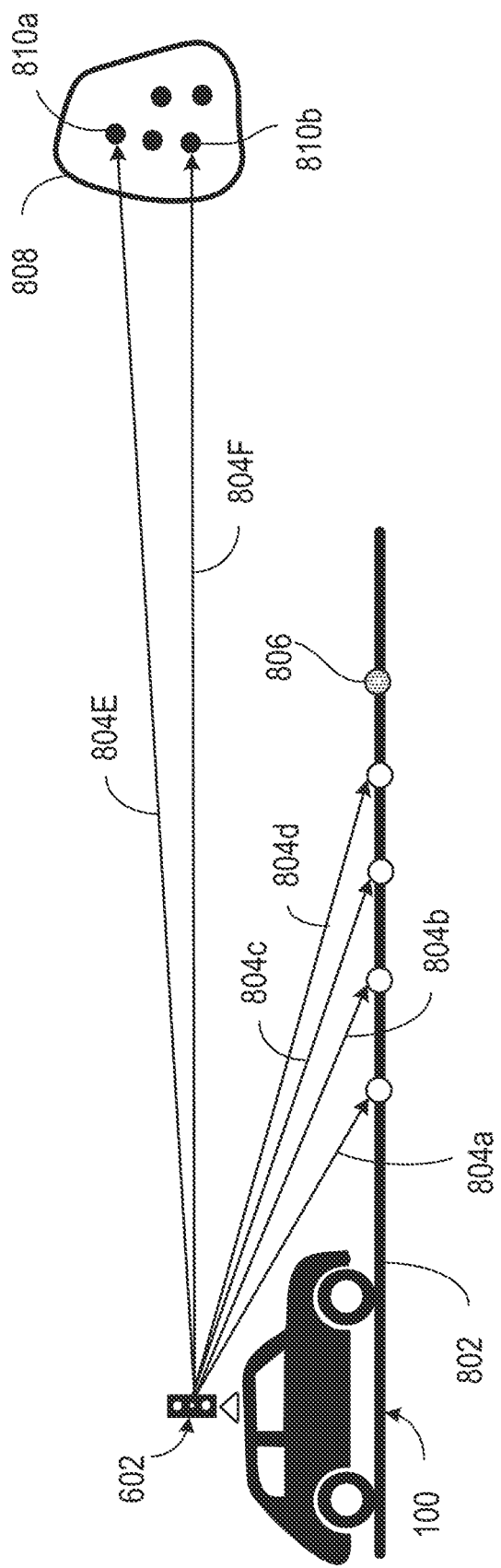
FIG. 8 shows the operation of the LiDAR system in additional detail.

FIG. 8 shows the operation of the LiDAR system 602 in additional detail. As described above, the vehicle 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the vehicle 100 travels over the ground 802, the LiDAR system 602 will continue to detect light reflected by the next valid ground point 806 if nothing is obstructing the road. However, if an object 808 obstructs the road, light 804*e-f* emitted by the LiDAR system 602 will be reflected from points 810*a-b* in a manner inconsistent with the expected consistent manner. From this information, the vehicle 100 can determine that the object 808 is present.

Path Planning

Figure 9:
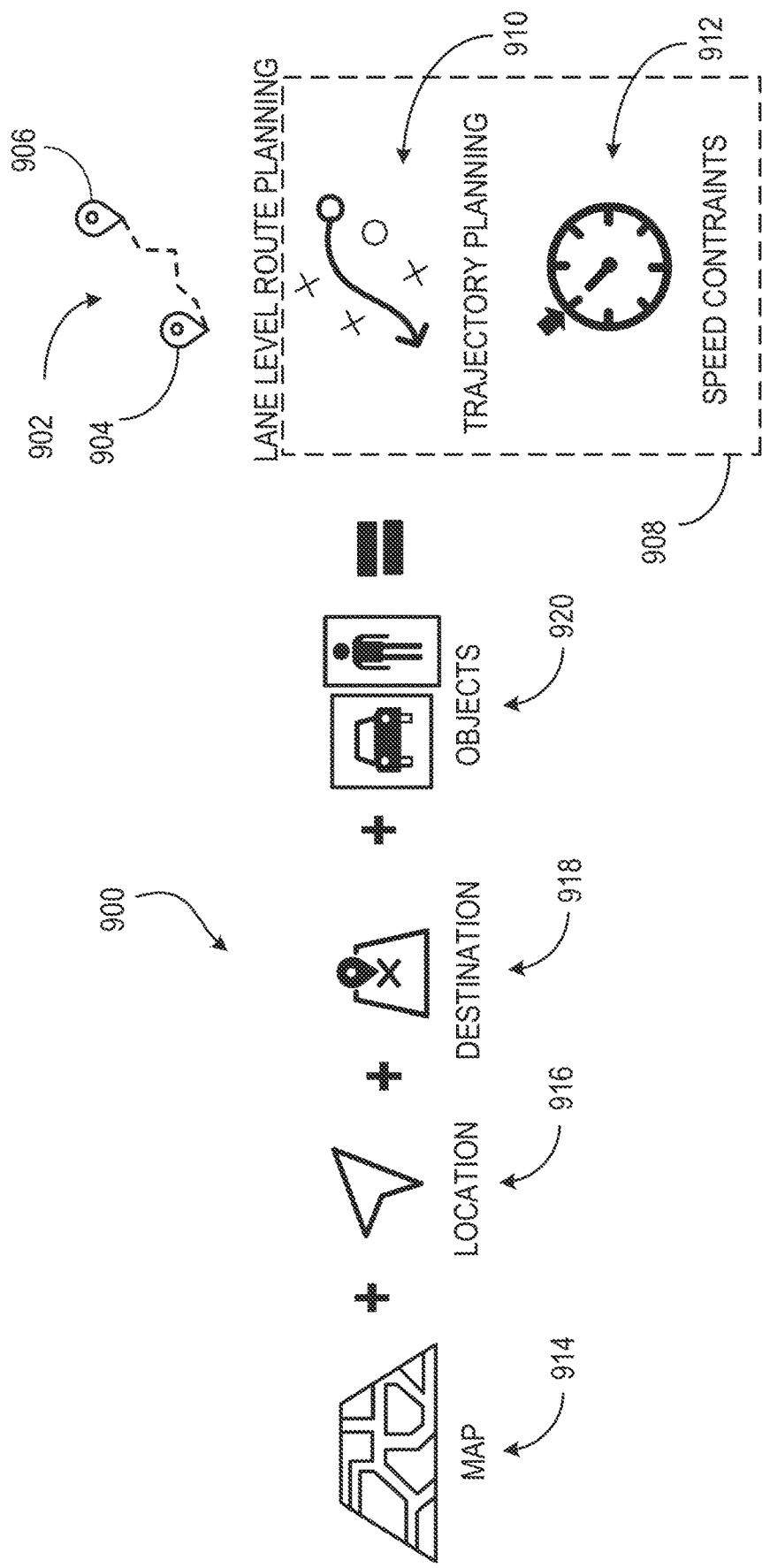
FIG. 9 shows a block diagram of the relationships between inputs and outputs of a planning system.

FIG. 9 shows a block diagram 900 of the relationships between inputs and outputs of a planning system 404 (e.g., as shown in FIG. 4). In general, the output of a planning system 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the vehicle 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning system also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the vehicle 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the vehicle 100 to a travel speed slower than an expected speed, e.g., a speed based on speed limit data for the segment.

In an embodiment, the inputs to the planning system 404 includes database data 914 (e.g., from the database system 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception system 402 as shown in FIG. 4). In some embodiments, the database data 914 includes rules used in planning. Rules are specified using a formal language, e.g., using Boolean logic. In any given situation encountered by the vehicle 100, at least some of the rules will apply to the situation. A rule applies to a given situation if the rule has conditions that are met based on information available to the vehicle 100, e.g., information about the surrounding environment. Rules can have priority. For example, a rule that says, "if the road is a freeway, move to the leftmost lane" can have a lower priority than "if the exit is approaching within a mile, move to the rightmost lane."

AV Control

Figure 10:
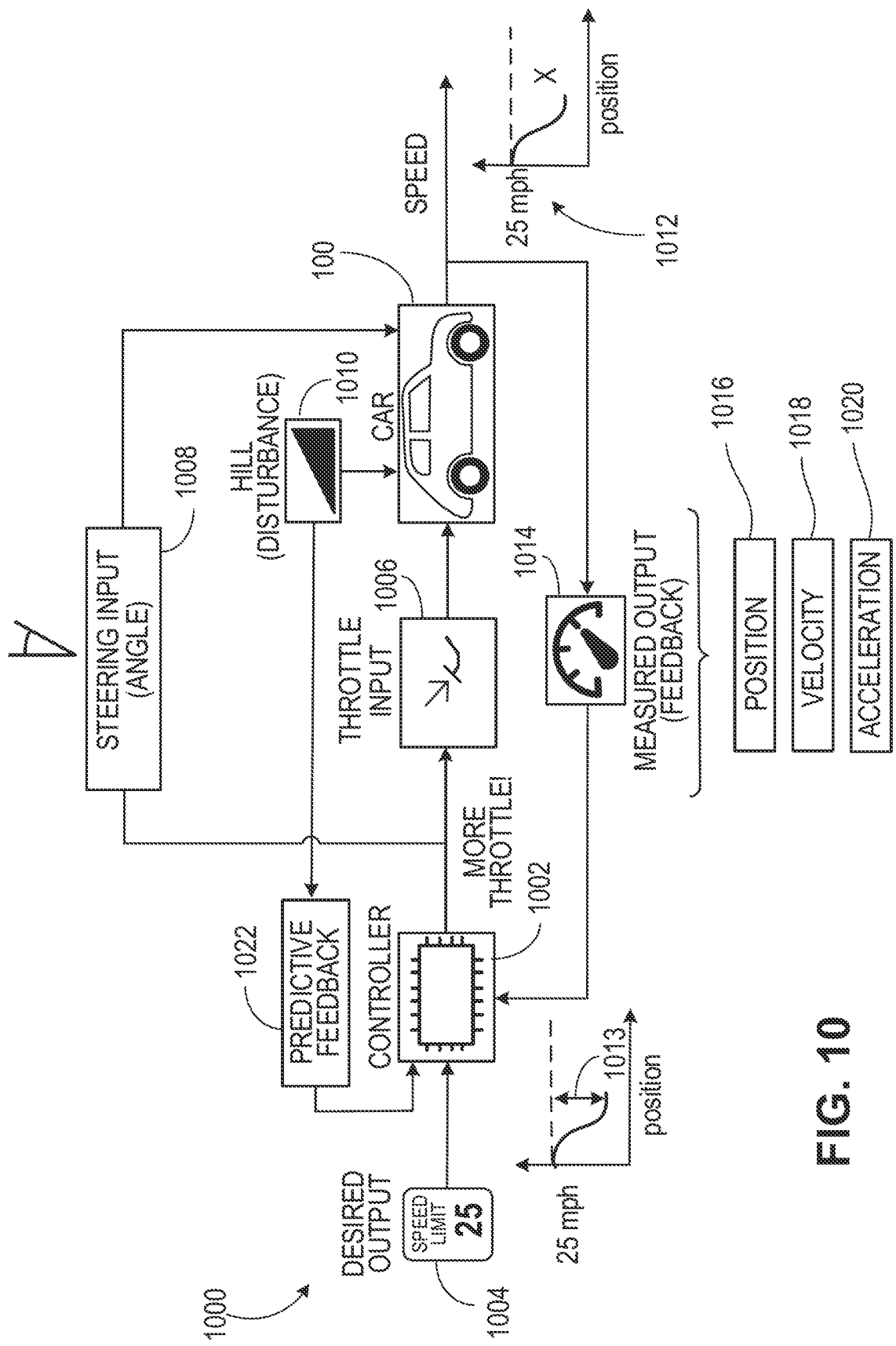
FIG. 10 shows a block diagram of the inputs and outputs of a control system.

FIG. 10 shows a block diagram 1000 of the inputs and outputs of a control system 406 (e.g., as shown in FIG. 4). A control system operates in accordance with a controller 1002 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 310, and instructions stored in memory that carry out operations of the controller 1002 when the instructions are executed (e.g., by the one or more processors).

In an embodiment, the controller 1002 receives data representing a desired output 1004. The desired output 1004 typically includes a velocity, e.g., a speed and a heading. The desired output 1004 can be based on, for example, data received from a planning system 404 (e.g., as shown in FIG. 4). In accordance with the desired output 1004, the controller 1002 produces data usable as a throttle input 1006 and a steering input 1008. The throttle input 1006 represents the magnitude in which to engage the throttle (e.g., acceleration control) of a vehicle 100, e.g., by engaging the steering pedal, or engaging another throttle control, to achieve the desired output 1004. In some examples, the throttle input 1006 also includes data usable to engage the brake (e.g., deceleration control) of the vehicle 100. The steering input 1008 represents a steering angle, e.g., the angle at which the steering control (e.g., steering wheel, steering angle actuator, or other functionality for controlling steering angle) of the AV should be positioned to achieve the desired output 1004.

In an embodiment, the controller 1002 receives feedback that is used in adjusting the inputs provided to the throttle and steering. For example, if the vehicle 100 encounters a disturbance 1010, such as a hill, the measured speed 1012 of the vehicle 100 is lowered below the desired output speed. In an embodiment, any measured output 1014 is provided to the controller 1002 so that the necessary adjustments are performed, e.g., based on the differential 1013 between the measured speed and desired output. The measured output 1014 includes a measured position 1016, a measured velocity 1018 (including speed and heading), a measured acceleration 1020, and other outputs measurable by sensors of the vehicle 100.

In an embodiment, information about the disturbance 1010 is detected in advance, e.g., by a sensor such as a camera or LiDAR sensor, and provided to a predictive feedback system 1022. The predictive feedback system 1022 then provides information to the controller 1002 that the controller 1002 can use to adjust accordingly. For example, if the sensors of the vehicle 100 detect ("see") a hill, this information can be used by the controller 1002 to prepare to engage the throttle at the appropriate time to avoid significant deceleration.

Figure 11:
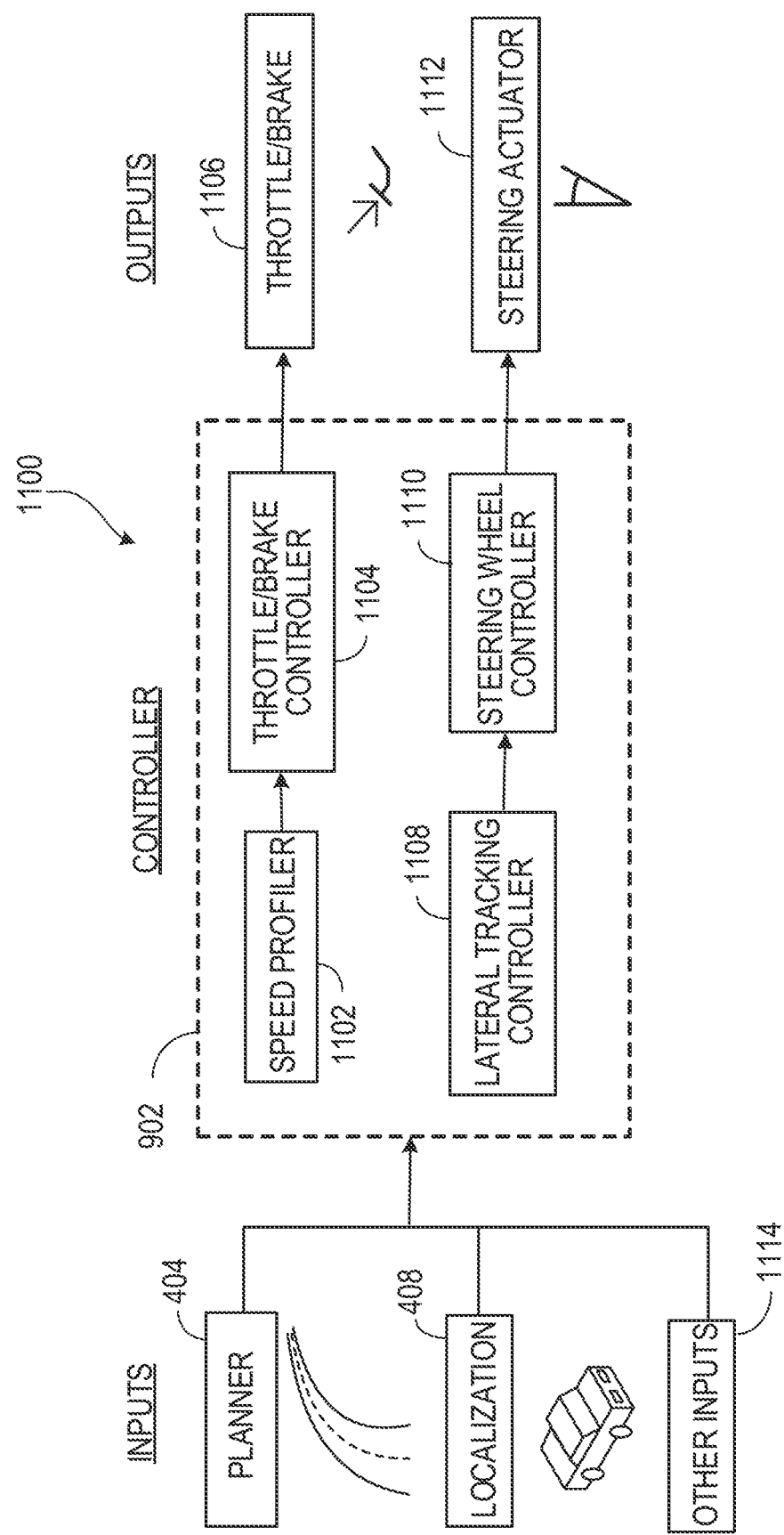
FIG. 11 shows a block diagram of the inputs, outputs, and components of a controller.

FIG. 11 shows a block diagram 1100 of the inputs, outputs, and components of the controller 902. The controller 902 has a speed profiler 1102 which affects the operation of a throttle/brake controller 1104. For example, the speed profiler 1102 instructs the throttle/brake controller 1104 to engage acceleration or engage deceleration using the throttle/brake 1106 depending on, e.g., feedback received by the controller 902 and processed by the speed profiler 1102.

The controller 902 also has a lateral tracking controller 1108 which affects the operation of a steering controller 1110. For example, the lateral tracking controller 1108 instructs the steering controller 1110 to adjust the position of the steering angle actuator 1112 depending on, e.g., feedback received by the controller 902 and processed by the lateral tracking controller 1108.

The controller 902 receives several inputs used to determine how to control the throttle/brake 1106 and steering angle actuator 1112. A planning system 404 provides information used by the controller 902, for example, to choose a heading when the vehicle 110 begins operation and to determine which road segment to traverse when the vehicle 110 reaches an intersection. A localization system 408 provides information to the controller 902 describing the current location of the vehicle 110, for example, so that the controller 902 can determine if the vehicle 110 is at a location expected based on the manner in which the throttle/ brake 1106 and steering angle actuator 1112 are being controlled. In an embodiment, the controller 902 receives information from other inputs 1114, e.g., information received from databases, computer networks, etc.

Precedence Determination

The present techniques enable a determination of precedence at a multiway stop. In embodiments, the determination of precedence is adapted to accommodate agents that may roll the stop sign at the multiway stop intersection (i.e. pass the stop sign without first stopping before the location designated by infrastructure). Generally, precedence refers to an order of right of way permitted sequential traversal, based on observation by vehicles in combination with road regulations. In examples, vehicles observe when their respective paths cross, such as at an intersection, and rely on precedence order to resolve conflicts and avoid collision. The precedence order determines a priority of each vehicle through the intersection. As used herein, a vehicle with a higher precedence proceeds through the intersection prior to a vehicle with a lower precedence.

A multiway stop is a type of intersection with at least some traffic control enforced by signs (e.g., a stop sign) or other passive traffic control measures (e.g., flashing red lights). For example, at a multiway stop, a stop sign is present on at least two roads of travel that meet at the intersection. In embodiments, an intersection of multiple roads creates a multiway stop, wherein traffic flow is controlled by a plurality of stop signs. To navigate the multiway stop, the AV and agents generally comply with rules of the road, which include traffic laws and other understood norms to cross the intersection.

In examples, a multiway stop is an intersection that does not have indicators for agents on each intersection approach that indicate how and/or when to proceed through the intersection. Non-signalized multiway stop intersections on roads today require negotiation to be performed by agents, which includes error-prone human analysis of the state of an intersection as well as the state of all agents navigating through that intersection. Additionally, vehicles or other agents at the intersection or on approach to the intersection are periodically occluded. Thus, in examples the vehicles or other agents at the intersection or on approach to the intersection may not be consistently visible. Further, the agents can fail to comply with the applicable road rules. For example, vehicles may execute a rolling stop at a stop sign of an intersection, rather than coming to a complete stop as dictated by the stop sign.

Figure 12A:
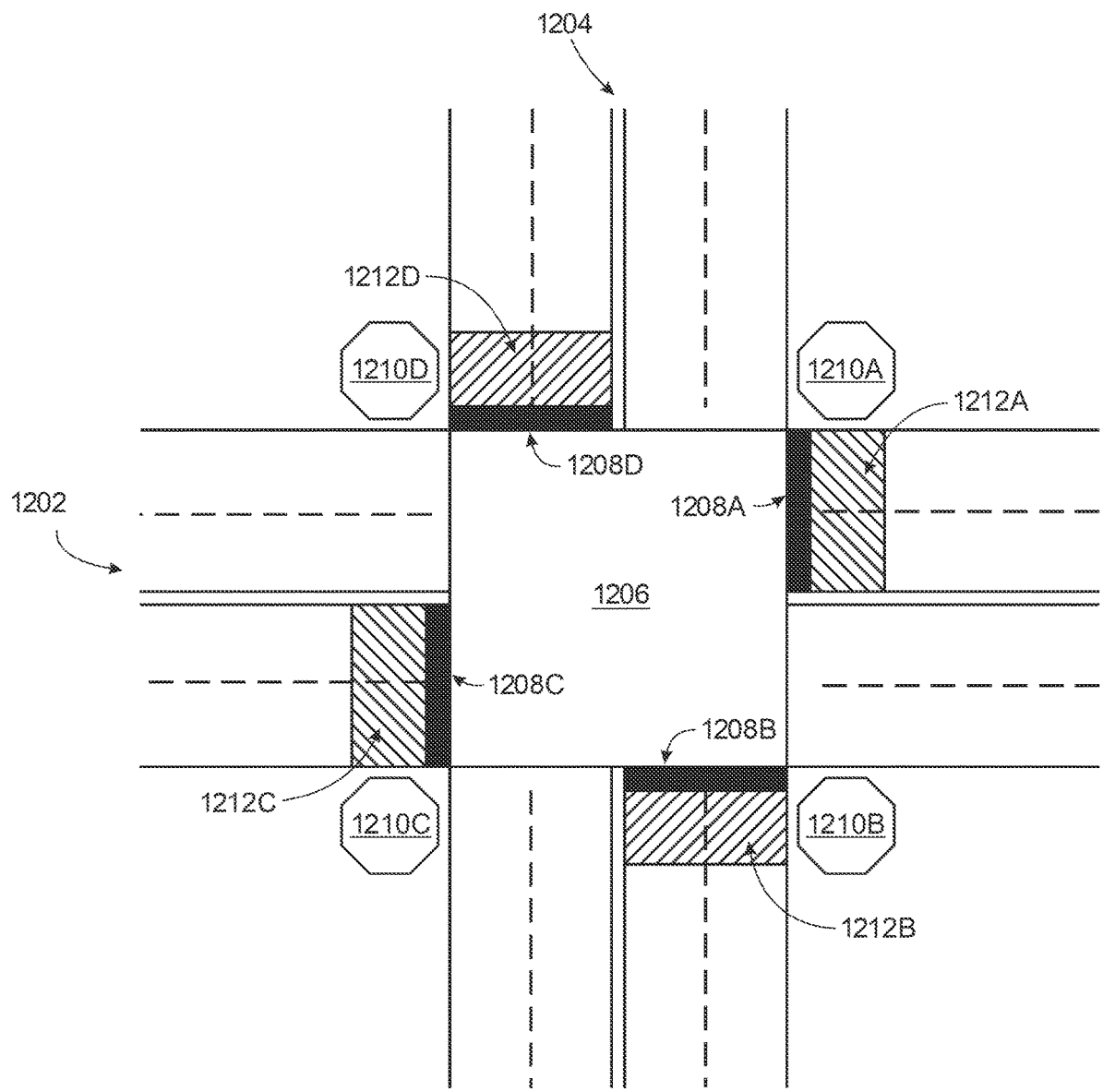
FIG. 12A is an illustration of a multiway stop.

FIG. 12A is an illustration of a multiway stop 1200A. Generally, a multiway stop is an intersection where a plurality of roads cross one another, with traffic flow on a road controlled by at least one stop sign or other traffic control device. At the multi-way stop 1200A, a road 1202 and a road 1204 cross forming the multiway stop 1200A. For ease of description, the multiway stop 1200 may be referred to as an intersection. In the example of FIG. 12A, the road 1202 and the road 1204 cross at the intersection 1206 of the multiway stop 1200A.

As illustrated, the multiway stop 1200A is a four way stop with stop lines 1208A, 1208B, 1208C, and 1208D (collectively referred to as stop lines 1208) applied to the road surface. The multiway stop 1200A also includes stop signs 1210A, 1210B, 1210C, and 1210D (collectively referred to as stop signs 1210). Accordingly, as illustrated the multiway stop 1200A is a controlled stop, where all approaches to the intersection 1206 are controlled by stop signs. A multiway stop according to the present techniques may be an uncontrolled stop. At an uncontrolled stop or intersection, no stop lines or stop signs are present. The multiway stop further includes stopping areas 1212A, 1212B, 1212C, and 1212D (collectively referred to as stopping areas 1212). While the multiway stop includes stop lines 1208, stop signs 1210, and stopping areas 1212 for traffic control, the stop lines 1208, stop signs 1210, and stopping areas 1212 may not be present at an intersection. However, the present techniques are applicable to any intersection where multiple roads cross, and a precedence order for crossing the intersection is based on an agreed order by agents at the intersection. For ease of description, the stop lines, stop signs, and stopping areas may be used interchangeably to describe a predetermined location where an agent or AV should stop prior to navigating through the intersection.

An AV (e.g., vehicle 100) navigates along a road (e.g., road 1202, 1204) and observes other agents (e.g., a vehicle, pedestrian, bicycle, motorcyclist, or other entity that will likely proceed through the intersection) at or near the intersection. When the agent is observed and associated with a behavior or trajectory, the AV generates a track for the respective agent. In an embodiment, a track is a continuous collection of data corresponding to poses (location and orientation) of an agent. For ease of description, the terms agent, track, and vehicle can be used interchangeably to refer to an entity subject to ordering for travel through the intersection. Additionally, some examples described herein refer to vehicles that are ordered for travel through an intersection. However, the present techniques apply to any agent that approaches and travels through the intersection which may legally be assigned the right of way to travel along a lane.

In embodiments, to enable a determination of precedence at a multiway stop, such as the intersection 1200A, the present techniques assign a unique identification to observed tracks, and re-identify tracks that have been previously observed. As used herein, unique refers to an assigned identification being distinct and independent from other assigned identifications. In examples, the present techniques can determine whether the currently observed tracks are re-observed or are newly observed tracks. A re-observed track is associated with an agent that was previously observed, was occluded or obscured from view in some manner, and was observed again after the occlusion is removed or the obscured area is resolved. A newly observed track is a track with no prior detection history (e.g., no prior occlusions). In examples, obscured from view refers to a loss of perception of an agent. For example, an agent can be obscured from view due to perception failures such as intermittent sensor faults or range limitation in adverse weather. A perception obscured area is an area within a field of view of the vehicle where perception data is unavailable (e.g., perception is blocked or data is corrupted). In examples, the present techniques are applied when an agent is occluded. Occlusion refers to perception being blocked by another object.

Identification (ID) and re-identification (re-ID) as described herein enable determination of a precedence order. In embodiments, the precedence order is contingent upon a determination that an agent could have arrived at the intersection prior to the current, host autonomous vehicle (AV) based on the observation of tracks. Additionally, the present techniques can determine a precedence order when a vehicle fails to come to a complete stop at a stop line, stop sign, or stopping area of the intersection. Failing to come to a complete stop at a before entering the intersection where a stop is expected, and instead slowing to a low or rolling rate of speed is referred to as a rolling stop. For example, during a rolling stop, a vehicle may reduce its speed to a slow, creeping speed, but fail to completely stop when road rules or signs indicate that a stop is required. As described herein, the present techniques determine when a vehicle is performing such a rolling stop, and when to yield to a vehicle performing the rolling stop.

An order according to the present techniques may be determined based on a number of rules. For example, the rules include (1) occupying the intersection, (2) first in, first out (FIFO), (3) yield-to-the-right (YTR), and (4) Straight, Near, Far, U-turn (SNFU). In embodiments, the rules are hierarchical in the order listed, where the first rule determines agents with the highest precedence, the next rule determines agents with the next highest precedence, and so on. In embodiments, geographic differences may exclude and/or shuffle the priority ordering of these rules, or employ additional rules derived from arrival order and relative positions.

In examples, if a vehicle is occupying the intersection (e.g., the vehicle is currently inside the intersection), that vehicle has precedence. A vehicle is inside an intersection when a threshold portion of the vehicle is within an area (e.g., distance beyond a stop line or ingress distance into overlapping lane regions) where multiple roads cross, such as the intersection 1206. For example, the threshold portion could be specified as extending one meter, two meters, three meters, etc. into the intersection. After agents occupying the intersection are assigned a precedence order, FIFO ordering is evaluated. With FIFO ordering, a vehicle has a higher precedence than the AV if the vehicle is the first vehicle to arrive at the intersection. Next, YTR ordering is evaluated. In YTR ordering, an agent to the right (counterclockwise) has precedence when agents arrive at an intersection at approximately the same time (e.g., concurrent agents). In a straight, near, far, U-turn (SNFU) ordering, precedence is based on agent turning intentions. For example, for agents at opposing directions, the agent travelling straight or making the near turn (e.g., right for locations with right-hand traffic, and left for locations with left hand traffic) has precedence over agent making the far turn (e.g., left for locations with right-hand traffic, right for locations with left-hand traffic) or a u-turn. For ease of description, this example and the present techniques are described generally using precedence orders in right-hand traffic (e.g., locations that drive on the right side of the road). However, the present techniques also apply to left-hand traffic.

In examples, occupying the intersection is a higher priority rule when compared to a first in, first out precedence order. For example, if at the moment the agent is observed the agent is substantially in the intersection, the AV will yield to the agent, even if the agent was previously occluded. If there is any agent occupying the intersection, the present techniques give the agent occupying the intersection a highest priority, regardless of if the agent is on a conflicting path with the AV. However, if the agent is in the intersection and not on a conflicting path with the AV, the AV is not required to yield.

As described in the scenarios below, the order of appearance of an unobserved vehicle in the AV field of view impacts the precedence order for a compliant progression through the intersection. Moreover, the rules for determining safe AV precedence order are adapted when a non-compliant vehicle is observed executing a rolling stop through the intersection.

Figure 12B:
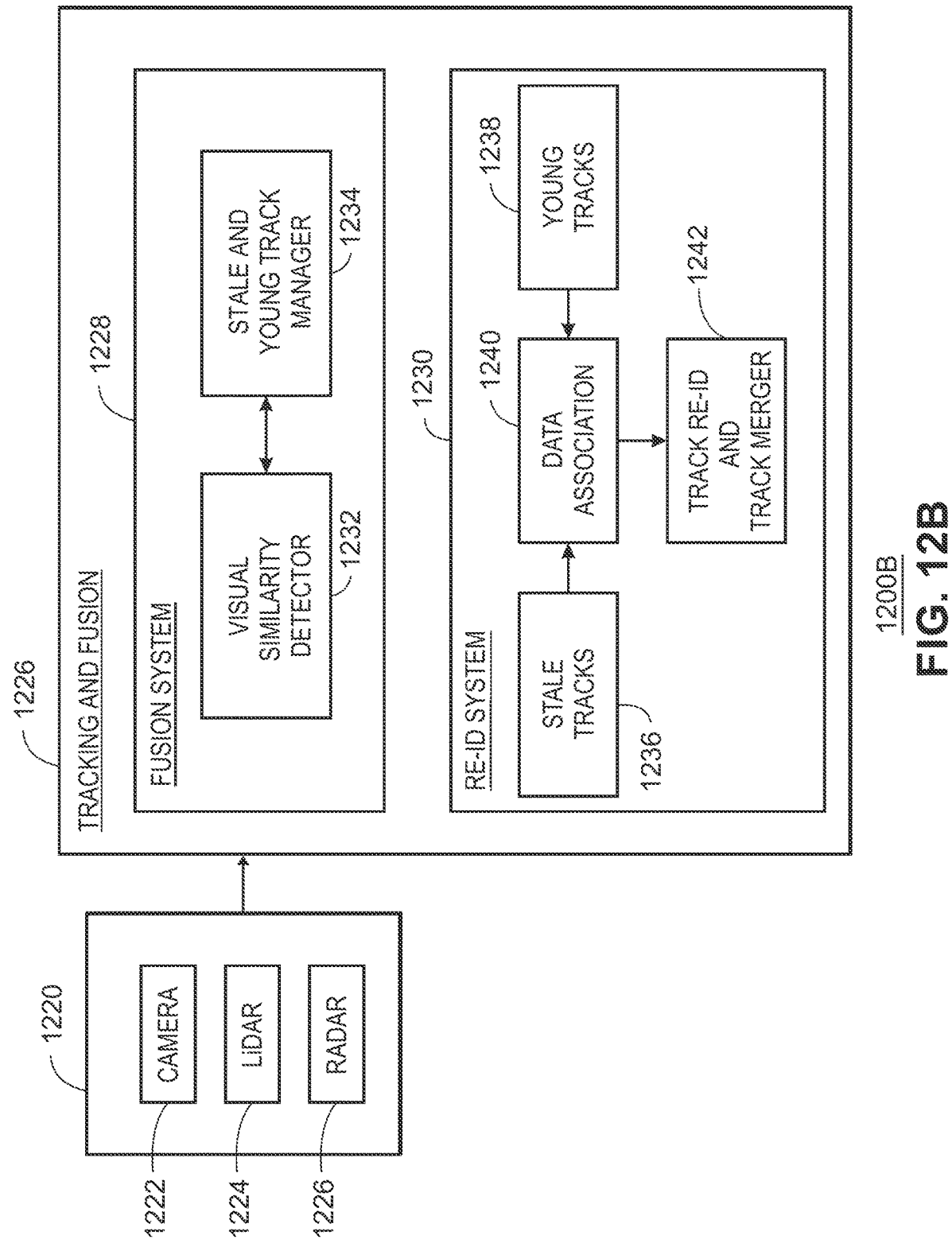
FIG. 12B is a block diagram of a system that enables re-identification of previously observed agents.

FIG. 12B is a block diagram of system 1200B that enables re-identification of previously observed agents. As illustrated, the system 1200B includes a sensor hub/perception 1220 (e.g., sensors 121 of FIG. 1). In the example of FIG. 12B, a camera 1222 (e.g., cameras 122 of FIG. 1), LiDAR 1224 (e.g., LiDAR 123 of FIG. 1) and radar 1226 are used by the AV (e.g., vehicle 100) to perceive the surrounding environment.

Perception data is transmitted to a tracking and fusion hub 1226. The tracking infusion hub 1226 includes a fusion system 1228 and a re-identification system 1230. The fusion system 1228 receives perception data from the sensor hub 1220. Visual similarity detector 1232 obtains a measurement history of a track and monitors a visual similarity among all tracks. For example, the measurement history includes historical data from the sensor hub/perception 1220, wherein data from the sensor hub/perception 1220 is continuously observed and stored. Visually similar data from the sensor hub/perception 1220 is extracted from the data output by the sensor hub/perception 1220 and transmitted to a stale and young track manager 1234 that manages the creation and updating of tracks. For example, the stale and young track manager 1234 creates tracks from visually similar perception data and assigns an identification to the newly observed tracks. A stale track is a track where the agent that created the track is no longer observable within the AV field of view. A young track is a newly observed track with an agent present in the AV field of view. Once a young track is matched with a stale track, the young track's identification is superseded by the stale track identification, thus the current identity is assigned to match the stale track and the prior identification stored in memory as an intermediate identification. In many cases, this re-identification by matching a young to a stale track is used to obtain an earlier observed time of arrival at the intersection by the stale track prior to loss of observation. It is also possible for the time of arrival at the intersection to occur at a time instance where the young track was not yet matched to a stale track, thus by maintaining a record of intermediate identifications, the AV will not lose the intersection arrival time of the agent.

The re-identified system 1230 receives stale tracks 1236 and young tracks 1238 as created and updated by the fusion system 1228. Data association 1240 associates tracks from the fusion system 1228 by matching tracks that belong to the same agent. For example, matching is a determination that the track associated with the intermediate identification could have originated from a previously observed and identified track based on a first pose of the track, the time occluded, and the last pose of the previously observed and identified track. In an embodiment, the data association determines a probability that the last pose of the previously observed and identified track results in the first post of the track associated with the intermediate identification during the time occluded. Additionally, the data association can predict an association among tracks from the fusion system 1228. In examples, the stale tracks are continually compared with young tracks, as the young tracks are associated with agents that can be re-identified if they were previously observed in the AV field of view. The stale tracks are those tracks belonging to agents that were previously observed in the AV field of view. Thus, when a young track is associated with a stale track, the young track and stale track are merged at track re-identify and track merger 1242. In examples, the track re-identify and track merger 1242 checks the stale tracks 1236 and determines whether the stale tracks 1236 and the young tracks 1238 should be associated and determined to be the same. If so, the tracks are merged. Merging tracks includes resolving IDs assigned to tracks that belong to the same agent as determined through data association.

For example, when a young track is associated with a stale track, the young track is assigned the ID of the associated stale track.

In examples, more than one intermediate ID is assigned to a young track before the young track is re-identified and merged with a stale track. Depending on the performance of the visual similarity detector, the intermediate ID assigned by the stale and young track manager 1234 may change as similarity thresholds are satisfied. For example, if data that is visually similar is not detected, a portion of perception data used to generate a track is unavailable. Additionally, noise in the measured data (e.g., outputs 504a-d of FIG. 5) can cause corruption or other errors in data used to generate a track.

In operation, as an AV (e.g., vehicle 100) approaches an intersection, the identification as described in FIG. 12B is applied to other agents approaching or at the intersection. The identification, re-identification, or lack thereof associated with a track assigned to an agent is used to determine precedence order for navigation through the intersection. Based on the identification, re-identification, or lack thereof, the agents on approach to an intersection are placed into one or more categories. In particular, a planning system (e.g., planning system 404) maintains a history of prior agents, concurrent-agents, and subsequent agent. A prior agent refers to an agent that has reached the intersection before the AV. The prior agents have precedence over the AV according to a first in first out (FIFO) ordering. A concurrent agent is an agent that arrives at an intersection at approximately the same arrival time as the AV. Since the arrival time of concurrent-agents are approximately the same as the AV, a first in first out ordering results in a tie. In this scenario, additional rules may be applied to determine a precedence order. A subsequent agent is an agent that arrives at the intersection after the AV. The AV has precedence over the subsequent agents according to a FIFO ordering.

In examples, when a track associated with a vehicle is re-identified, the successful re-identification is used to place the agent corresponding to the re-identified track into any of the above described categories (prior agent, concurrent agent, or subsequent agent). All IDs, including intermediate IDs, have a category assignment. For example, if a track is placed in a first category, then disappears, and is re-identified, the first category is associated with the re-identified track. If the track is a freshly observed track, timestamps associated with the track are determined to place the freshly observed track in a category.

For example, newly observed vehicles that are not re-identified (e.g., a young track not associated with a stale track) are categorized as prior agents if and only if the originating stop sign area was occluded for the duration of the time from when the AV first stopped at the intersection to the time that the vehicle is first observed. Put another way, for the entire time period beginning with the AV arriving at the intersection to the time that the vehicle was first observed, a state of the intersection where the vehicle is now located is unknown. A reasonable worst-case assumption is that the vehicle arrived before the AV and was unobserved by the AV. As used herein, unobserved refers to a lack of data or perception. Otherwise, the newly observed vehicle is placed in the subsequent agent category.

In embodiments, creeping speed constraints are applied to assist in precedence order determination by the AV. Creeping speed constraints further enable safe navigation through a multiway stop. For example, when the AV is at an intersection and a stop of the intersection is occluded, the AV is unable to determine if a vehicle is present at the occluded stop due a lack of perception data. In response to a hypothetical agent occupying an obscured stopping area, the AV moves forward slowly under the creeping speed constraints despite lack of higher precedence order assignment (aka creeping slowly into the intersection). In some embodiments, a creeping speed constraint is a maximum velocity or acceleration that governs the movement of the AV. In examples, the creeping speed can be one, two, three, four, or five miles per hour.

To navigate in the presence of an occlusion (and no active constraints from observable agents), the AV can execute the low, creeping speed to move forward through the intersection. A creeping speed is a slow move forward to enable improved visibility of the occluded portion of the intersection. This can occur, for example, when stop signs or stop lines are set back at a distance from the intersection/cross road area. When stop signs or stop lines are set back at a distance from the intersection/cross road area, a vehicle traveling in the same direction as the AV can cause limited visibility of the AV by occluding another portion of the intersection as described with respect to FIG. 17.

In embodiments, the present techniques quantify risk thresholds for creeping up from the stop line to the border of the intersection versus proceeding to enter the intersection. For example, if the risk threshold is considered low, the AV may proceed to enter the intersection slowly, even in the presence of unobservable stopping areas. Otherwise, the present techniques may rely on remote vehicle assistance to overcome a stop at an intersection due to occlusion. Moreover, the present techniques execute predictive occlusion at future states to determine whether creeping forward will improve visibility. For example, the occlusion at future positions is predicted to determine an availability of creeping forward to increase visibility. In embodiments, the present techniques also enable creeping backwards to resolve an occlusion as long as no obstacles (e.g., objects, agents, and/or the like) are behind the AV. In this manner, an occlusion can be resolved without remote vehicle assistance.

In addition to creeping forward or backward to resolve the occluded portion of the intersection, a hypothetical agent is presumed to be located in each obscured stopping area. The hypothetical agent is classified as a prior agent. In some examples, an identification is assigned to the hypothetical agent which, classified as a prior agent. The hypothetical agent is associated with a time window, and a precedence order for navigating the multiway stop is determined based on the hypothetical track being located in the stopping area over the time window that would put the track into a prior agent category. The time window is, for example, a period of time that begins when the AV has stopped, and terminates when the AV has traveled through the intersection (e.g., time period 1310, time period 1314 of FIG. 13). In some examples, the hypothetical agent has a higher precedence order when classified as a prior agent, and creeping forward can violate the precedence order in view of local rules (e.g., legislated rules, including first in, first out (FIFO), yield-to-the-right (YTR), and Straight, Near, Far, U-turn (SNFU)), the assigned identifications, and the earliest time of appearance of agents. This violation is allowed when the precedence order includes a hypothetical agent. In some embodiments, the earliest time of appearance of agents is determined at a perception obscured area by observing that a first agent arrives at a respective stopping area of the multiway stop intersection prior to the vehicle, and the stopping area is obscured continuously for a period of time from when the vehicle first reached its respective stopping area until an observation of a young track associated with the first agent.

Figure 12C:
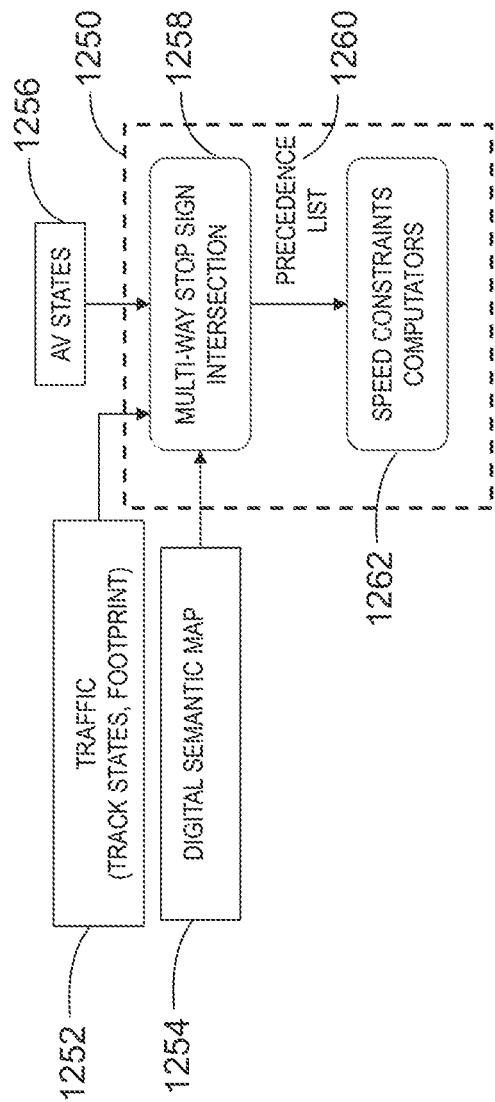
FIG. 12C is a block diagram of a system that enables handling of rolling stops.

FIG. 12C is a system 1200C that enables precedence determinations during the execution of a rolling stop. A rolling stop handler 1250 includes a multiway stop sign intersection handler 1258 and speed constraints computators 1262. The multiway stop sign intersection handler 1258 determines a precedence list 1260. For example, the multiway stop sign intersection handle 1258 includes all or a portion of the system 1200B of FIG. 12B. The precedence list includes a list of observed agents, tracks, and a category of the vehicle.

The rolling stop handler 1250 takes as input traffic data 1252, digital semantic map 1254, and AV states 1256. The traffic data 1252, digital semantic map 1254, and AV states 1256 are used to modify the precedence order determination as described with respect to FIG. 1200B. The traffic data 1252 includes track states and a footprint. A track state may be, for example, velocity, footprint, or turn signal states. An AV state 1256 includes, for example, an AV footprint, position, and velocity. The semantic map 1254 is a map of the current location according to a localization system (e.g., localization system 408 of FIG. 4). Accordingly, when an AV arrives at an intersection, a precedence list of tracks is developed that includes categories as discussed with respect to FIG. 12B. The traffic data 1252, digital semantic map 1254, AV states 1256, and categories as found in the precedence list 1260 used to assign speed constraints to the AV at the multiway stop. Accordingly, a speed constraints computator 1262 applies speed constraints to agents at the intersection to detect the execution of a rolling stop.

Once a rolling stop is detected, the precedence list is modified according to rolling stop handling and the AV will yield if one or more conditions are met. As discussed above, in the precedence list each agent is assigned to a category, such as prior agent, concurrent-agent or subsequent agent. The rolling stop handling logic evaluates additional or other conditions to adapt the precedence list assignment according to the present multiway stop. In embodiments, the conditions associated with rolling stop handling can modify the precedence order determined with respect to FIG. 12B. Conditions may be, for example, occupying the stop sign, intersection polygons, traffic speed, signed displacement traffic, AV to actual stop sign relation, and the like. Rolling stop handling is further described with respect to FIGS. 18A-18C.

A condition includes, for example, a determination on if an agent is at a relevant stopping area (e.g., occupying the stop sign). To be considered at a relevant stop line, a footprint of the agent is compared with a stop line area polygon. In embodiments, the stop line area polygon is a configurable size. Accordingly, this condition determines if the other agent is at or near a respective stopping area.

Another condition is determining if the AV has stopped. The AV is considered stopped when the footprint of the AV is within a stopping area and the speed of the AV is below some threshold, such as less than 0.1 meters per second. In embodiments, using a threshold to consider a stopping point is distinguished from using a velocity measurement of zero as a stopping point, since velocity measurements can include noise that prevents a measurement of zero velocity by the AV. In embodiments, the AV threshold for stopping is different from a threshold for stopping applied to other agents, which can account for differing noise in the AV versus other agent velocity measurements, as well as potentially different behavioral norms (e.g. human drivers may typically be more aggressive or non-compliant). Additionally, the thresholds are independently configurable and are based on an agent type. In examples, a timeout is applied to the velocity measurements to determine that the AV is stopped. If the AV is below a predetermined speed for a certain amount of time, then AV is considered completely stopped. For example, the timeout may be spending half a second below 0.1 m/s.

A condition used to adapt the precedence list assignment according to the present multiway stop during multiway stop handling is a determination on whether the AV or another agent is "further ahead." For example, the present techniques compare a signed relative longitudinal distance of the agents and AV with respect to their associated stop line at a time when the AV first stopped. Additionally, another condition is an intersection state. In examples, the intersection state is an independent state associated with an agent and is a determination that the agent is inside the intersection or that the agent has left the intersection. An agent may be considered inside the intersection based on a configurable distance threshold to account for typical stop line overshoot versus staking claim to proceed through the intersection. For example, being inside the intersection is the other agent extending inside the intersection by going one, two, or three meters beyond the stop line. The entire footprint of the agent is not required to be inside the intersection to stake claim to the intersection. An agent has left an intersection when it has previous intersection states of "has previously completely entered intersection" (a configurable definition) and "not inside intersection." When the intersection state is "has left intersection," the intersection traversal is complete and the agent is removed from the precedence list.

Figure 13:
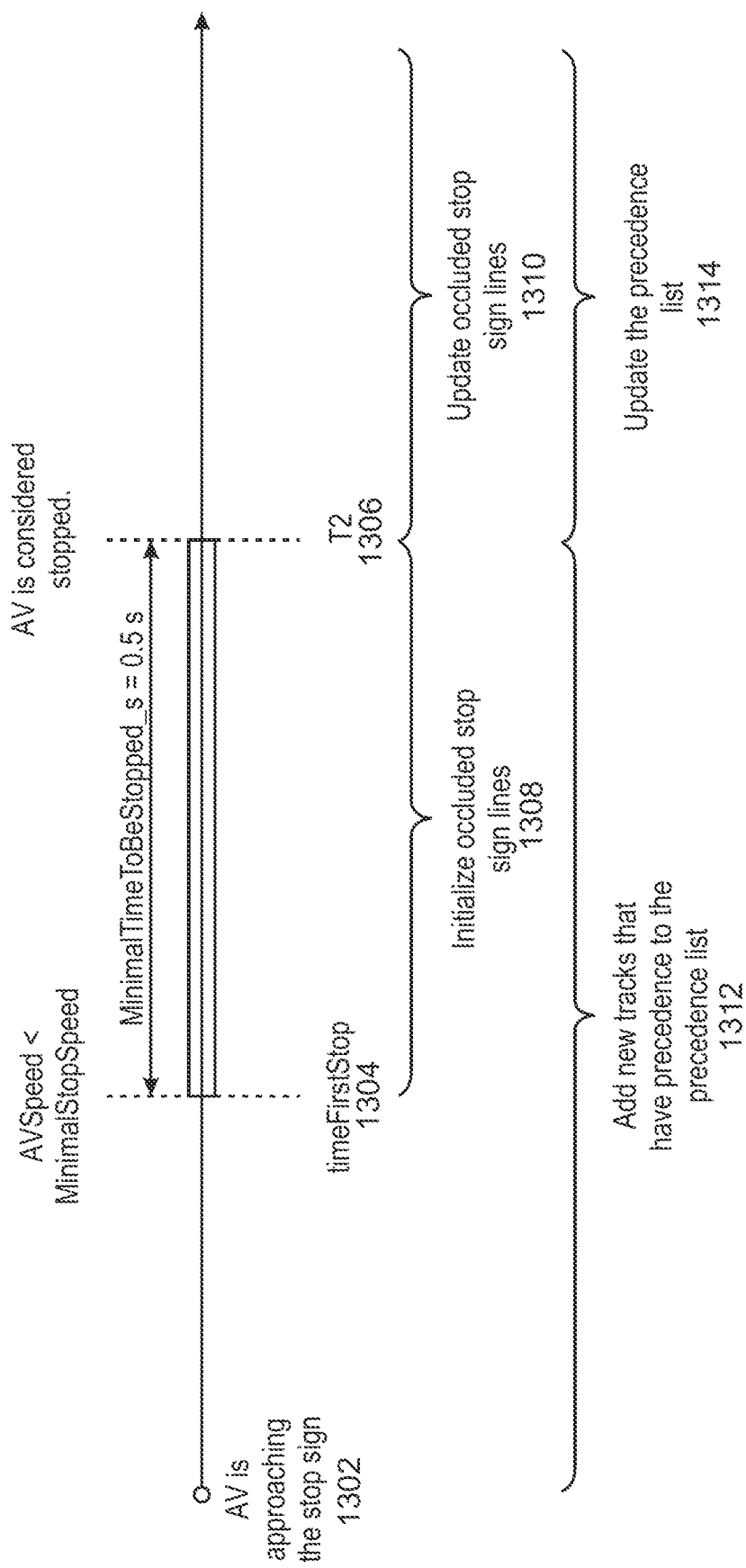
FIG. 13 is a timing diagram according to the present techniques

FIG. 13 is a timing diagram 1300 according to the present techniques. At time 1302, the AV is approaching a stop sign. The present techniques enable the continuous addition of detected tracks to a precedence list, and the AV yields according to the precedence list. In embodiments, the precedence list is dynamic and continually evolves as view obscuring conditions occur. In embodiments, the approach to a multiway stop is determined according to a map, such as the map 1254 of FIG. 12C. For example, lane boundaries, lane connectivity, and stopping areas are all specified in the map, such as the map 914 of FIG. 9. The possible approaches to the intersection are reflected in this lane connectivity, where the AV's approach is according to the route planning over the lane connectivity graph, such as the lane level route planning data 908 of FIG. 9.

By incorporating all tracks in the precedence list, including those generated after an occlusion, the present techniques avoid failures to yield, which can result in a conflict with the agent at the intersection (e.g., collision). Thus, the present techniques determine whether the currently observed agents are either re-observed agents that were intermittently occluded (re-identified) or newly observed agents with no prior detection history. The present techniques apply re-identification, or lack thereof, to determine precedence order. In examples, the precedence order is primarily contingent on making assumptions of whether the previously unseen agent could have arrived at the intersection before the AV. Accordingly, the present techniques determine if the AV stopped before any other agent at an occluded stop line.

At time 1304, the AV initiates braking and begins to decelerate. In examples, time 1304 is the time instant at which the AV initiates braking on approach to the intersection. The time 1304 is defined by the AV speed being less than a minimal stop speed, wherein the minimal stop speed is a low speed tolerance threshold selected to mitigate uncertainty or noise in AV speed measurements. In some cases, uncertainty or noise prevents the speed of the AV from being measured at exactly zero. Accordingly, a minimal stop speed may be 0.1 m/s to account for such uncertainty and noise. When the AV initiates braking at time 1304, the AV initializes occluded stop sign lines during time period 1308. Occluded stop sign lines are initialized by identifying a location for a stop sign line at the intersection, and determining if the stop sign line is occluded, and updating the precedence list with this information. For ease of description, stop sign lines are used to describe locations where agents come to a stop prior to crossing the intersection. However, the locations may be identified by stop lines, stop signs, stopping areas, or any combinations thereof.

In embodiments, a minimal time to be stopped is a minimum number or a lower threshold of time that it takes the AV comes to a complete stop. At time 1306, the AV is considered stopped. In some embodiments, the AV is stopped when a control system (e.g., control system 406 of FIG. 4) outputs zero speed (e.g., output 1004 of FIG. 10). After time 1306, occluded stop lines are updated during time period 1310. For example, on approach to the intersection, some stop sign lines may be occluded. Thus, from time 1304 to time 1306 (e.g., time period 1308), the AV initializes occluded stop sign lines of the intersection. After time 1306, when the AV is at a complete stop, the occluded stop sign lines are updated during time period 1310, as further occlusions may occur when the AV is at a complete stop. Moreover, some occlusions are resolved when the AV is at a complete stop. As illustrated, new tracks that have precedence may be added to the precedence list until the vehicle is stopped at time 1306 during the time period 1312. After the vehicle is stopped at time 1306, the precedence list is updated during time period 1314. In examples, the precedence list is initialized when the AV begins to brake upon approach to an intersection. For example, locations with stops of a multiway stop are identified, and agents are observed at each location. Stop locations with occlusions are determined, and a precedence list is created for the intersection. The precedence list is updated during time periods 1312 and 1314. The precedence list terminates when the AV has traveled through the intersection.

In examples, when the AV initiates braking at time 1304, any vehicle that appears at a previously occluded stop line area after the AV has begun braking is categorized as a prior vehicle in the precedence list. As discussed above, a prior vehicle arrives at the intersection before the AV. Accordingly, if another stop line (e.g., a stop line of another road that crosses the road on which the AV is currently traveling) is occluded for the entire duration from when the AV began to brake at time 1304 to when it comes to a complete stop at time 1306 (e.g., time period 1308), vehicles associated with young tracks are added to the precedence list as prior vehicles. On the other hand, if the another stop line was not occluded at any point after the AV initiates braking at time 1304 and comes to a complete stop at time 1306, and no agent arrives at the another stop line, the AV is considered to have arrived first at the intersection and is first in the precedence list.

The following scenarios illustrate the determination of a precedence order as described with respect to FIGS. 12A-13. For ease of description, stopping areas are used to describe locations where agents come to a stop prior to crossing the intersection. However, the locations may be identified by stop lines, stop signs, stopping areas, or any combinations thereof. In some cases, the precedence order is stored as a precedence list. The precedence order can be modified when agents execute rolling stops through the intersection.

Identification after Occlusion

Figure 14:
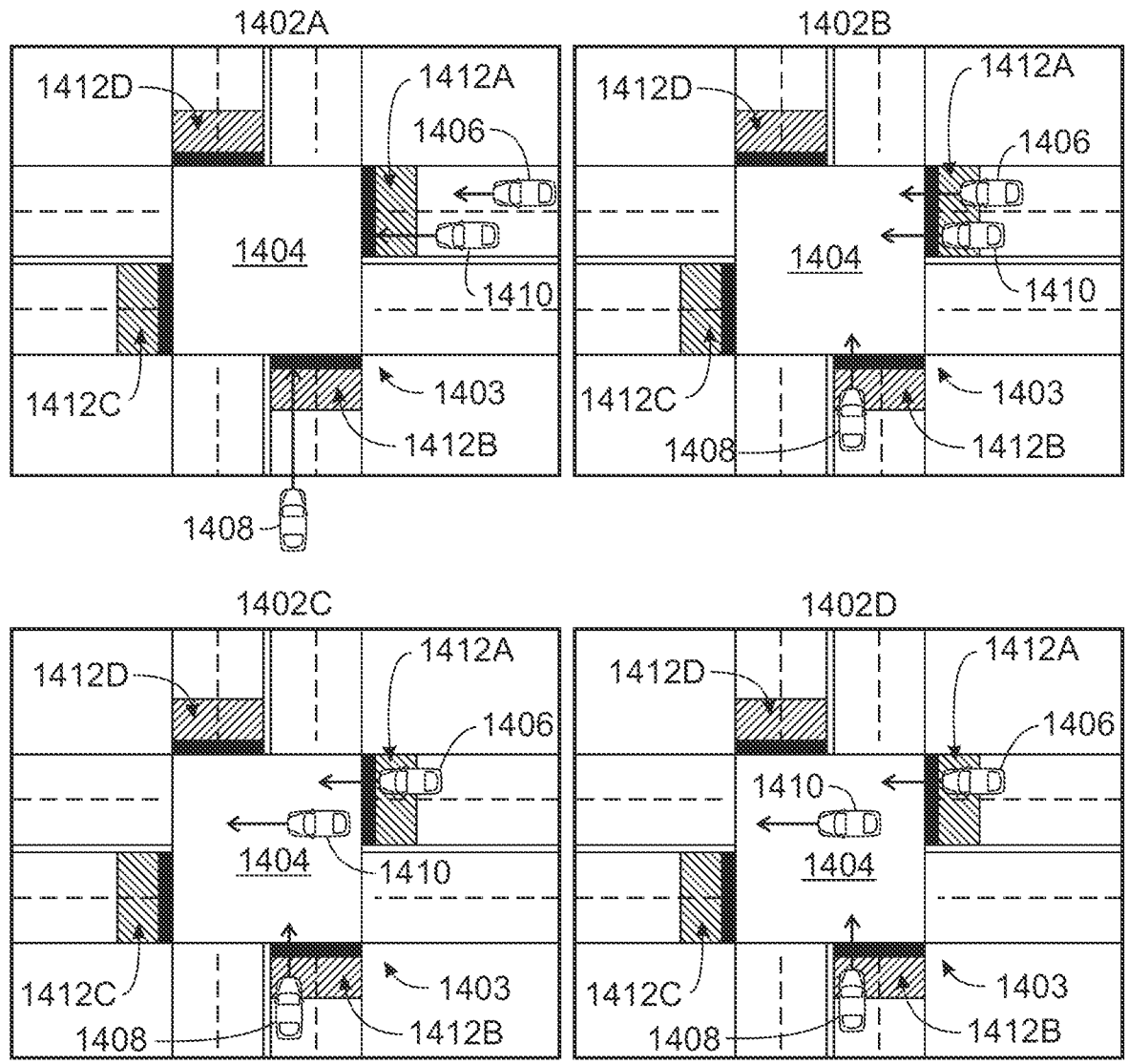
FIG. 14 is an illustration of a first scenario in which an AV approaches a multiway stop.

FIG. 14 is an illustration of a scenario 1400 in which an AV approaches a multiway stop 1403. In particular, a plurality of scenes 1402A, 1402B, 1402C and 1402D illustrate the scenario 1400 at four sequential timestamps, T0, T1, T2, and T3, respectively, as vehicles approach and navigate the multiway stop 1403 through the intersection 1404.

In the first scene 1402A at time T0, the AV 1406 approaches the intersection 1404. A vehicle 1408 and a vehicle 1410 also approach the intersection 1404 as illustrated in scene 1402A. The vehicle 1408 arrives at its stopping area 1412B prior to the AV 1406 arriving at the stopping area 1412A. As illustrated, the vehicle 1410 and the AV 1406 are approaching the intersection 1404 from the same direction and stop at the same stopping area 1412A (assuming vehicle 1410 follows the rules of the road) in adjacent lanes. The vehicle 1408 approaches the intersection 1404 and should stop at the stopping area 1412B according to the rules of the road. As illustrated in scene 1402A, the vehicle 1410 is observable by the AV 1406 as the AV 1406 approaches the intersection 1404. During this approach, the AV 1406 may assign an ID to the vehicle 1410 as the AV 1406 approaches the multiway stop. For example, the vehicle 1410 may be assigned an ID of 2.

In the second scene 1402B, the vehicle 1410 arrives at the stopping area 1412A prior to the AV 1406 arriving at the stopping area 1412A. Additionally, the vehicle 1408 arrives at its respective stopping area 1412B prior to the AV 1406 arriving at its respective stopping area 1412A. In this scenario 1400, the vehicles 1408 and 1410 arrive at their respective stopping area prior to the AV 1406 arriving at its stopping area. As illustrated in scene 1402B, vehicle 1410 occludes, blocks, or prevents the AV 1406 from observing the vehicle 1408 at its stopping area 1412B. Due to the position of vehicle 1410 blocking an observation of the stopping area 1412B by the AV 1406, the AV 1406 cannot determine if a vehicle is present at the stopping area 1412B as it approaches the intersection 1404. Accordingly, vehicle 1408 is occluded by vehicle 1410. In embodiments, the AV 1406 monitors all occluded stopping areas at an intersection. If a stopping area is occluded while the AV is on approach to the intersection 1404, the AV will incorporate vehicles into the precedence order as they become observable in a stopping area while on approach to the multiway stop. In this manner, the AV continuously updates the status of occluded stopping areas at the intersection 1404.

At scene 1402C, vehicle 1410 enters the intersection 1404. As the vehicle 1410 enters the intersection, the vehicle 1408 becomes observable by the AV 1406. The AV 1406 updates the precedence list by adding a new track once vehicle 1408 becomes observable in the previously occluded stopping area. In the scenario 1400, the track is newly observed and is not associated with any stale tracks since the vehicle 1408 was not observable by the AV 1406 at any time on approach to the intersection 1404. At scene 1402D, the vehicle 1410 is completely within the intersection of the intersection 1404. In an example, the previously occluded vehicle 1408 is assigned an ID of one. Since the stopping area 1412B was occluded when the AV 1406 arrived at the intersection 1404 and the vehicle 1408 became observable as the occlusion of the stopping area 1412B was resolved, the vehicle 1408 is categorized as a prior vehicle and the AV 1406 will yield to the vehicle 1408. Thus, the vehicle 1408 is assigned a precedence order higher than the AV 1406. The vehicle 1408 proceeds through the intersection of the intersection 1404 prior to the AV 1406.

Identification, Occlusion, and Re-Identification

Figure 15:
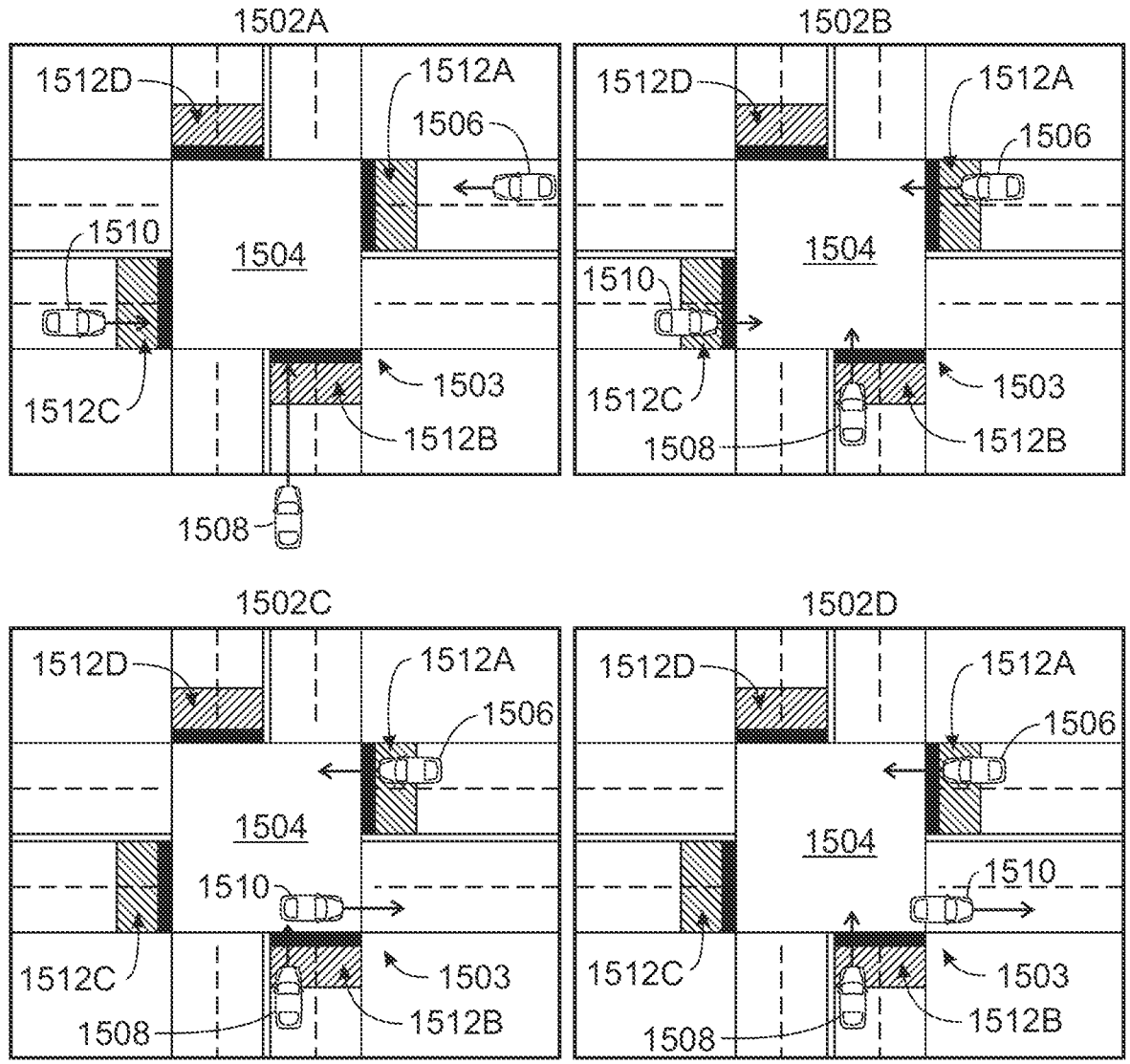
FIG. 15 is an illustration of a first scenario in which an AV approaches a multiway stop.

FIG. 15 is an illustration of a scenario 1500 in which an AV approaches a multiway stop. In particular, a plurality of scenes 1502A, 1502B, 1502C, and 1502D illustrate the scenario 1500 at four sequential timestamps T0, T1, T2, and T3, respectively, as vehicles approach and navigate the multiway stop 1503 through the intersection 1504.

In the first scene 1502A at timestamp T0, the AV 1506 approaches stopping area 1512A of the multiway stop 1503. The vehicle 1510 approaches the stopping area 1512C of the multiway stop 1503. The vehicle 1508 approaches the stopping area 1512B of the multiway stop 1503. On approach to the intersection 1504, the AV 1506 may observe each of the vehicle 1508 and the vehicle 1510. In this scenario, the precedence order is determined based on a prediction of which vehicle will arrive first to its stopping area.

In the first scene 1502A at timestamp T0, the vehicle 1510 arrives at its respective stopping area 1512C prior to the AV 1506 arriving at its respective stopping area 1512A. The vehicle 1508 approaches its respective stopping area 1512B and will arrive at its respective stopping area 1512B after the vehicle 1510 arrives at its stopping area 1512C, but prior to the AV 1506 arriving at its respective stopping area 1512A.

The vehicle 1510 is the first to arrive at its stopping area 1512C. In the scene 1502B at timestamp T1, the vehicle 1508 has come to a stop at its respective stopping area 1512B. In the second scene 1502B, the AV 1506 has not yet come to a complete stop at its respective stopping area 1512A of the intersection 1504.

In the third scene 1502C at timestamp T2, the vehicle 1510 proceeds across the intersection 1504 and blocks the AV 1506 from observing the vehicle 1508 as it is stopped at its respective stopping area 1512B. In the scenario 1500, as the vehicle 1510 is clearing the intersection, vehicle 1508 may initially be observed by the AV 1506, assigned an identification, and then occluded by the vehicle 1510 as it clears the intersection. Accordingly, in the third scene 1502C, the AV 1506 may be unable to determine if a vehicle is present at the stopping area 1512B. This occlusion creates a stale track associated with the vehicle 1508. In the fourth scene 1502D at timestamp T3, the vehicle 1510 has cleared the intersection of the intersection 1504. The vehicle 1508 is again observed in the stopping area 1512B by the AV 1506. A young track is created by the AV when the vehicle 1508 is observed in the stopping area after the occlusion is resolved.

As vehicle 1508 becomes observed after occlusion it is re-identified by matching the latest track observations to the previous stale track observation corresponding to the same agent as determined through data association as described with respect to FIG. 12B. Since the AV 1506 re-identified the vehicle 1508 (e.g., data association between young tracks and stale tracks in FIG. 12B), the AV 1506 is aware of the precedence order initially applied to vehicle 1508. In this example, the AV 1506 will yield to the vehicle 1508. In the scenario 1500, vehicle 1510 first proceeds through the intersection, followed by vehicle 1508, and then the AV 1506.

Resolving Intermediate IDs

Figure 16:
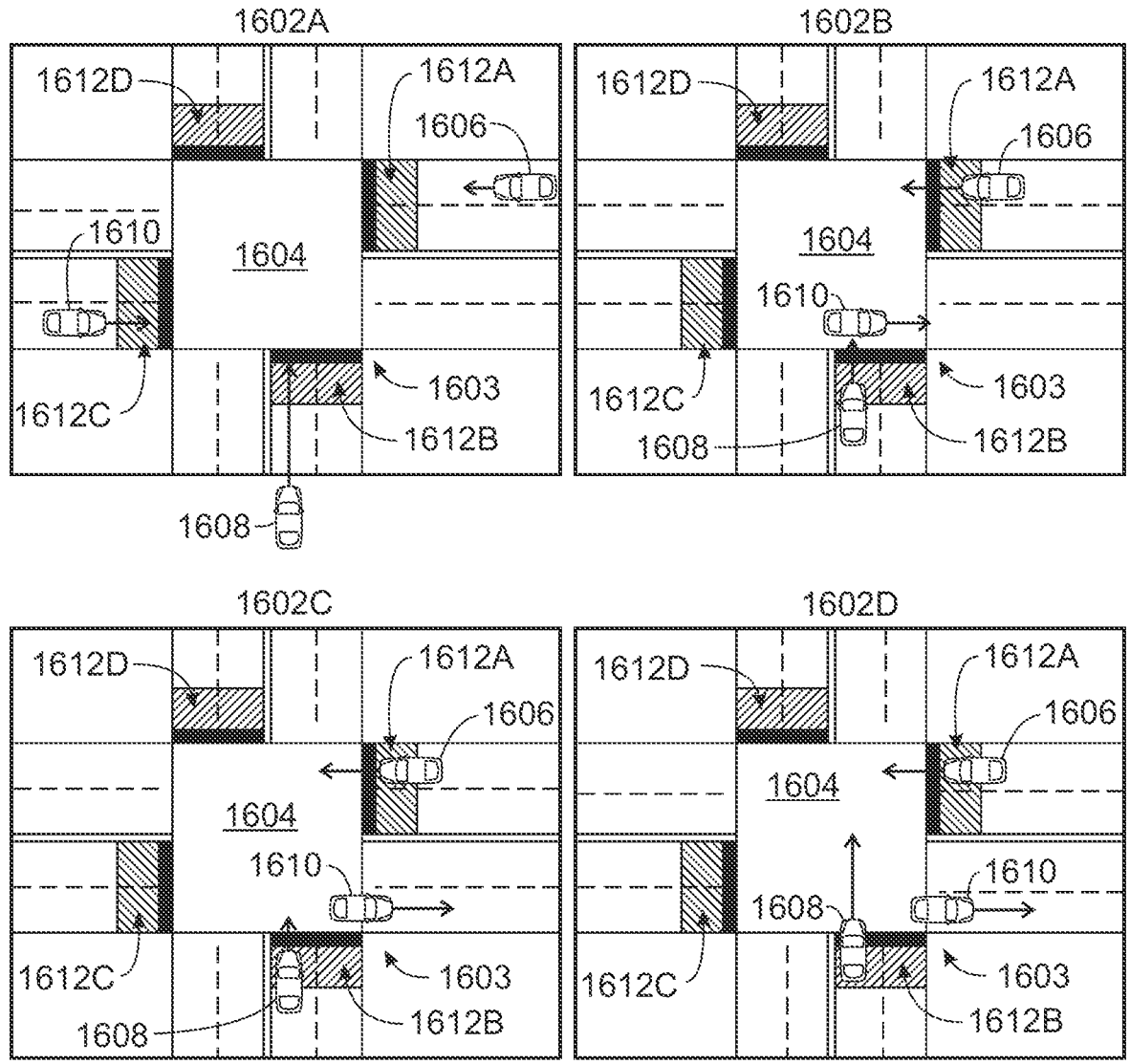
FIG. 16 is an illustration of a second scenario in which an AV approaches a multiway stop.

FIG. 16 is an illustration of a scenario 1600 in which an AV approaches a multiway stop 1603. In particular a plurality of scenes 1602A, 1602B, 1602C, and 1602D illustrate the scenario 1600 at four sequential timestamps, T0, T1, T2, and T3, respectively, as vehicles approach and navigate the multiway stop 1603 through the intersection 1604.

In the first scene 1602A at timestamp T0, the AV 1606 approaches a stopping area 1612A of the multiway stop 1603. A vehicle 1610 approaches the stopping area 1612C of the intersection 1604 multiway stop 1603. The vehicle 1608 approaches the stopping area 1612B of the multiway stop 1603. On approach to the intersection, the AV 1606 may observe each of the vehicle 1608 and the vehicle 1610. In the example of FIG. 16, the vehicle 1608 may be assigned an ID of one. The vehicle 1610 may be assigned an ID of two. As discussed above, the AV 1606 assigns an identification to vehicles as the AV 1606 approaches the stopping area.

In the first scene 1602A at timestamp T0, the vehicle 1610 arrives at its respective stopping area 1612C prior to the AV 1606 arriving at its respective stopping area 1612A and prior to the AV 1606 coming to a complete stop. The vehicle 1608 arrives at its respective stopping area 1612B next, prior to the AV 1606 arriving at its respective stopping area but after the vehicle 1610 has arrived at its respective stopping area 1612C.

In the second scene 1602B at timestamp T1, the vehicle 1610 proceeds through the intersection prior to the AV 1606 coming to a stop at its respective stopping area 1612A. As the vehicle 1610 proceeds through the intersection 1604, prior to the AV 1606 coming to a stop, the vehicle 1608 is occluded by the vehicle 1610.

In the third scene 1602C at timestamp T2, as the vehicle 1610 is clearing the intersection the vehicle 1608 becomes observable by the AV 1606. In examples, a track associated with the vehicle 1608 is re-identified after a short time delay. In embodiments, an intermediate ID is assigned to a newly created, young track. For example, a first ID is assigned to a track associated with the vehicle 1608 when the vehicle 1608 is first observed on approach to the stopping area 1612B could be assigned as three, which then becomes a stale ID during the occlusion event, and a second ID could be assigned to a the young track associated with the vehicle 1608 as four when the vehicle 1608 is observed after occlusion and not matched to stale track with ID three. In embodiments, the intermediate IDs are applied to young tracks during a short time window when the young track has yet to be associated with a stale track (e.g., previously observed track). The present techniques analyze a young track to determine if it is associated with a previously identified agent. In the scenario 1600, the second young track with ID four is matched with a previously identified stale track with ID three after a short time delay, based on stronger visual similarity in later observations of vehicle 1608. After the match and re-identification to again assign the ID of three to the track associated with vehicle 1608, the AV 1606 can determine that the tracks three and four share the same precedence. The track ID three is assigned the same precedence as the first intermediate ID. Within the time duration where the match is unresolved between track IDs three and four, track three may be incorrectly viewed as having arrived after the AV, thus the AV may start to progress forwards. However, in the fourth scene 1602D at timestamp T3, the AV 1606 again yields to the vehicle 1608, and assuming that the time duration with unmatched intermediate ID is relatively short, the AV's speed will still be low and thus it will only inch forward a small distance from its initial stopping location. Because the AV 1606 re-identified the vehicle 1608, the AV 1606 is aware of the precedence order applied to vehicle 1608. In this example, vehicle 1610 proceeds first through the intersection, followed by vehicle 1608, and then the AV 1606.

Creeping Maneuver

Figure 17:
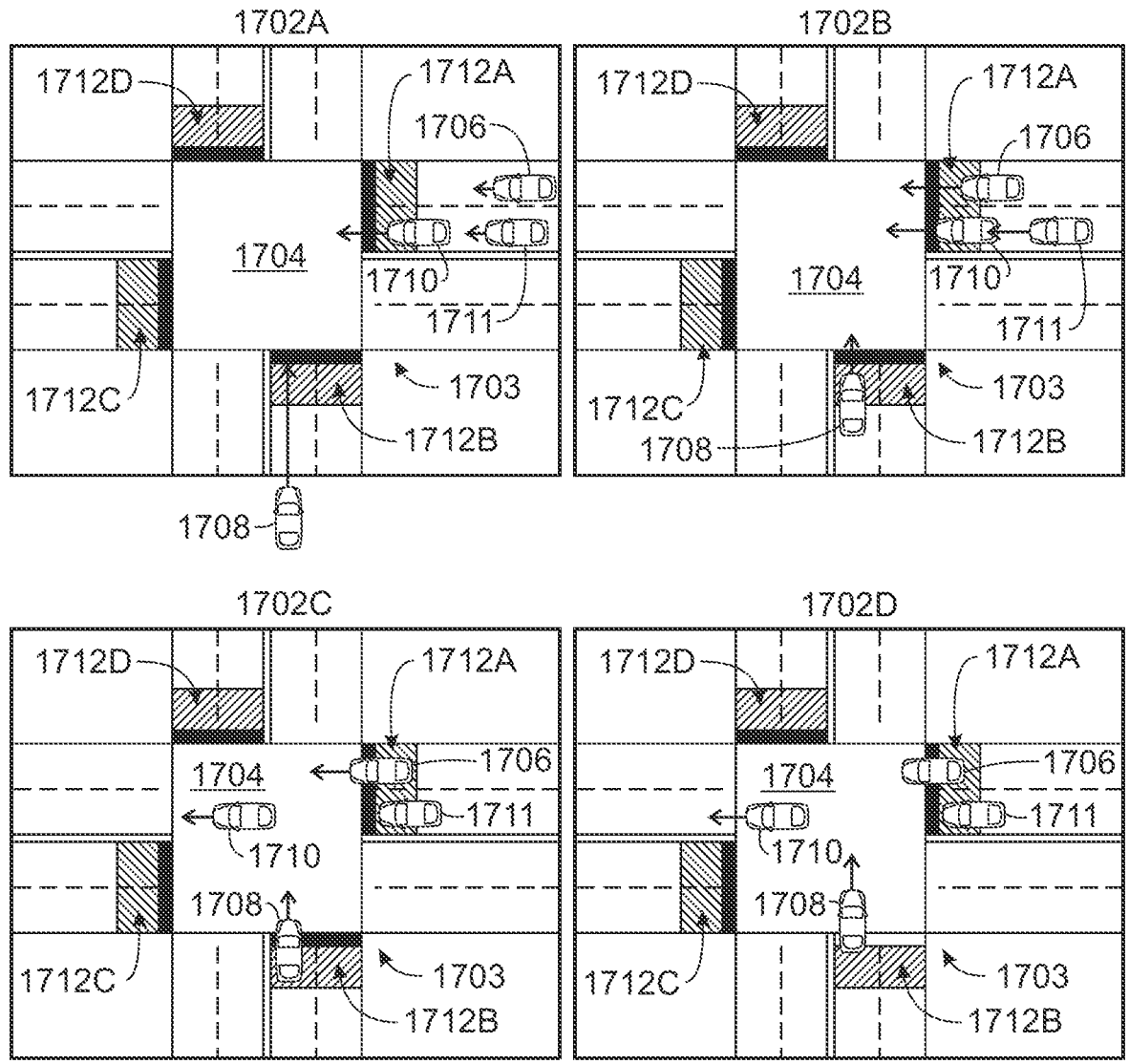
FIG. 17 is an illustration of a fourth scenario in which an AV approaches a multiway stop.

FIG. 17 is an illustration of a scenario 1700 in which an AV approaches a multiway stop 1703. In particular, a plurality of scenes 1702A, 1702B, 1702C, and 1702D illustrate the scenario 1700 at four sequential timestamps, T0, T1, T2, and T3, respectively, as vehicles approach and navigate the multiway stop through the intersection 1704.

In the first scene 1702A at timestamp T0, the AV 1706 approaches a stopping area 1712A of the intersection 1704. A vehicle 1710 and 1711 approach the same stopping area 1712A in adjacent lanes. A vehicle 1708 approaches the intersection towards a stopping area 1712B. As illustrated, the vehicle 1708 is occluded by the vehicle 1710 and the vehicle 1711. The AV 1706 may assign an identification to the observable vehicles 1710 and 1711. In the example of scenario 1700, the vehicle 1708 is occluded and is not observed by the AV 1706 on approach to the intersection 1704.

In the second scene 1702B at timestamp T1, the vehicle 1708 arrives at the stopping area 1712B of the intersection 1704. In the second scene 1702B, the AV 1706 has not yet come to a complete stop. However the vehicle 1708 is occluded by the vehicles 1710 and 1711, which both have been identified by the AV 1706.

In the third scene 1702C at timestamp T2, the vehicle 1710 proceeds through the intersection of the intersection 1704. As the vehicle 1710 proceeds through the intersection, the vehicle 1711 moves into the stopping area further occluding the stopping area 1712B. The vehicle 1708 is initially occluded and becomes observable after the AV 1706 slightly creeps forward to enhance visibility. The vehicle 1708 is observed after the AV 1706 performs the creep maneuver. As illustrated, the AV 1706 has slightly and slowly moved forward exceeding its stopping area 1712A to enhance visibility of the occluded stopping area 1712B. Accordingly, the creep maneuver is used by the AV 1706 to enhance visibility. After the creep maneuver, the vehicle 1708 is observable and is added to the precedence list maintained by the AV 1706. Since the vehicle 1708 is associated with a newly identified track after previous occlusion, the AV 1706 will yield to the previously occluded vehicle 1708. As illustrated in the fourth scene 1702D at timestamp T3, the vehicle 1710 proceeds first through the intersection, followed by the vehicle 1708, and then the AV 1706 and vehicle 1711. In this example, the vehicle 1711 is categorized as a concurrent vehicle or subsequent vehicle, and depending on the lane connectivity at the intersection, may not have a potential conflict via paths crossing with the AV regardless.

Precedence Order with Rolling Stops

Figure 18A:
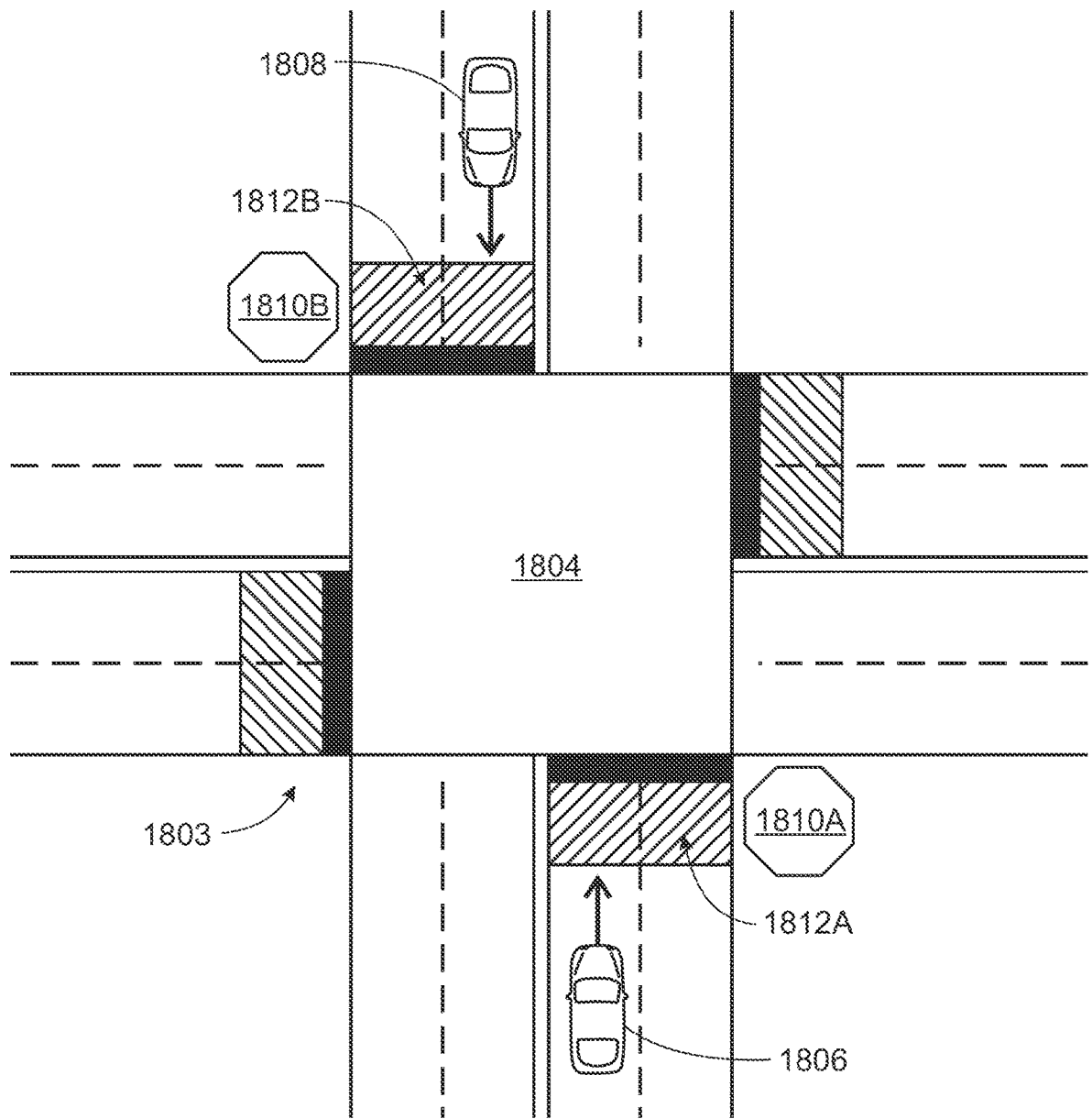
FIGS. 18A-18C illustrates a rolling stop scenario.
Figure 18B:
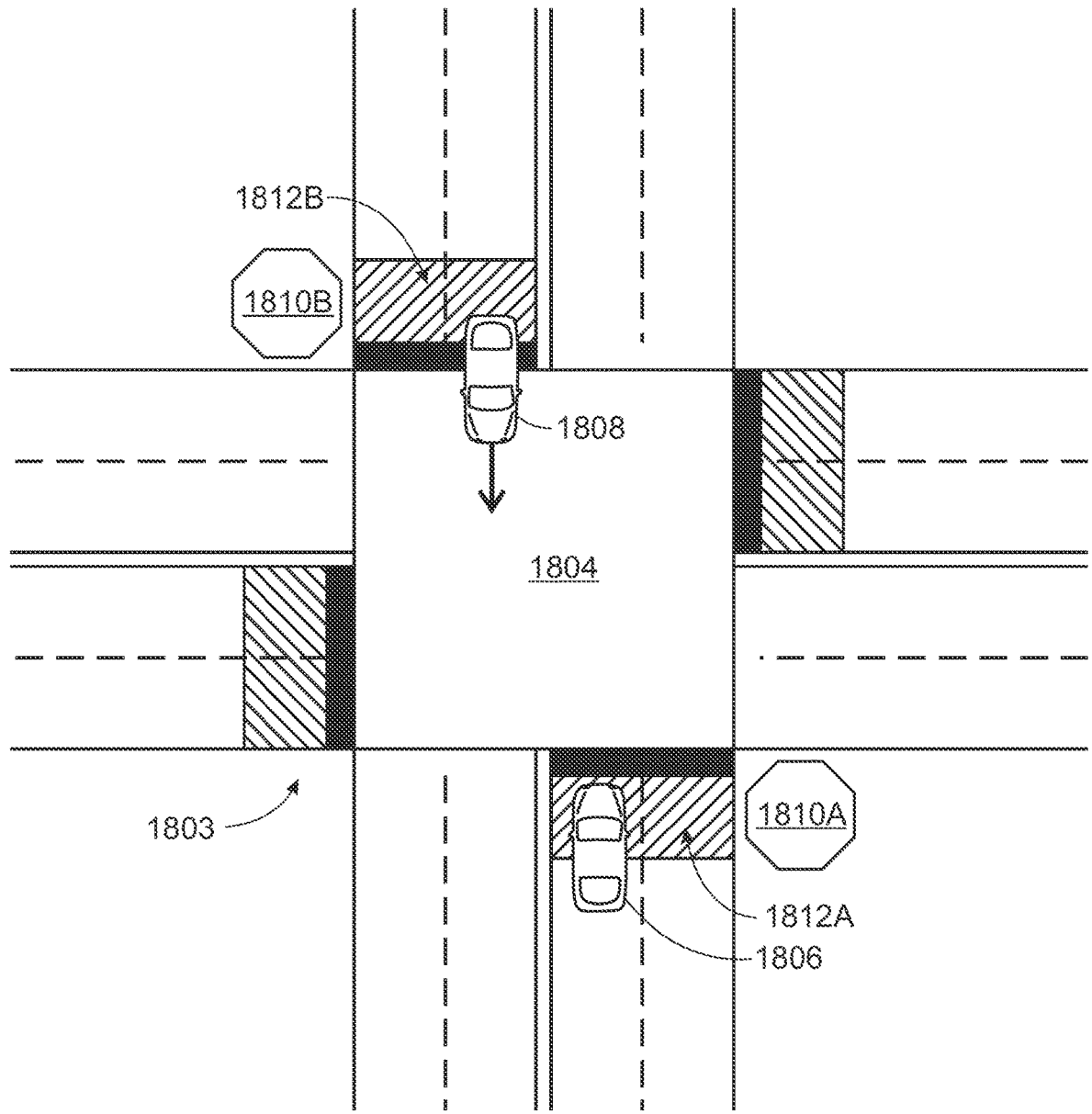
Figure 18C:
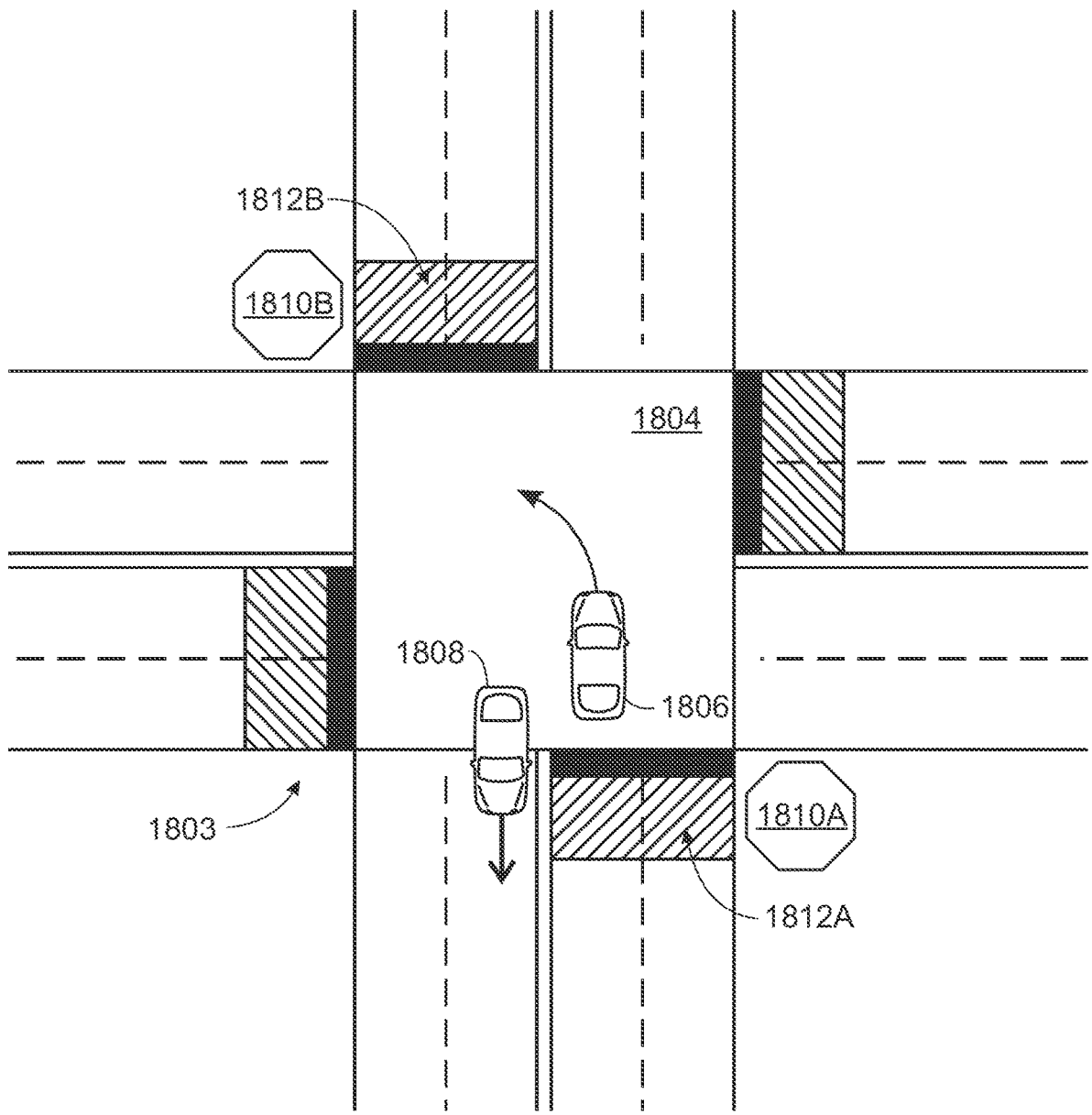

FIGS. 18A-18C illustrates a rolling stop scenario. As used herein, a rolling stop is a failure to come to a complete stop when regulations or other road rules indicate a complete stop is appropriate. For example, when coming to a multiway stop, vehicles often slow to a very low speed at or near a stopping area associated with the multiway stop, and then proceed through the intersection of the multiway stop.

In the scene 1800A, a multiway stop 1803 is illustrated with an intersection 1804. A stop sign 1810A controls traffic on a road traveled by the AV 1806. To navigate the intersection 1804, the AV stops at the stopping area 1812A as directed by the stop sign 1810A. Similarly, a stop sign 1810B controls traffic on a road traveled by a vehicle 1808. To navigate the intersection 1804, the vehicle 1808 should comply with the rules of the road and stop at the stopping area 1812B as directed by the stop sign 1810B.

As illustrated in FIG. 18B, the AV 1806 comes to a complete stop prior to crossing the intersection 1804. The vehicle 1808 fails to come to a stop prior to crossing the intersection 1804 and instead executes a rolling stop. For example, when coming to a multiway stop, vehicles often slow to a very low speed at or near a stopping area associated with the multiway stop, and then proceed through the intersection of the multiway stop.

In the example of FIGS. 18A-18C, the rolling stop handling described with respect to FIG. 12C applies to observed agents, not occluded agents. In particular, the rolling stop handling described herein improves the existing multiway handling logic to account for rolling stops or the lack of a complete stop at a stop sign. In embodiments, an AV will yield to vehicles meeting one or more conditions when a rolling stop is detected. The conditions may be, for example, occupying the stop sign, intersection polygons, traffic speed, sign displacement traffic, or in AV actually stopping at a stop sign. As illustrated in the scenario 1800B, the vehicle has overshot the stopping area 1812B. As described above, a condition detected by the AV is determining when a vehicle has overshot an intended stopping area or is farther into an intersection than the AV. Since the vehicle 1808 has passed an intended stopping area, rolling handling logic is applied and the AV yields to the vehicle 1808 in accordance with the rolling stop conditions described above. For example, as a means of conflict resolution, an agent executing a rolling stop is defined as being located within a predetermined distance of the intersection, having not decreased to a speed below a minimum threshold for stopping, and having progressed further forward with respect to their respective stopping area than the AV's forward progress relative to its stopping area. A higher precedence in the precedence order is assigned to a non-compliant agent executing a rolling stop to enable conflict resolution. In the scenario 1800C of FIG. 18C, the AV 1806 yields to the vehicle 1808 crossing the intersection. The vehicle 1808 completes the crossing of the intersection 1804, making a left turn after the vehicle 1808 clears the path of the AV. When the vehicle 1808 crosses the intersection 1804, the vehicle 1808 is removed from the precedence list, and the AV is then allowed to proceed through the intersection.

Process for Precedence Order Determination

Figure 19:
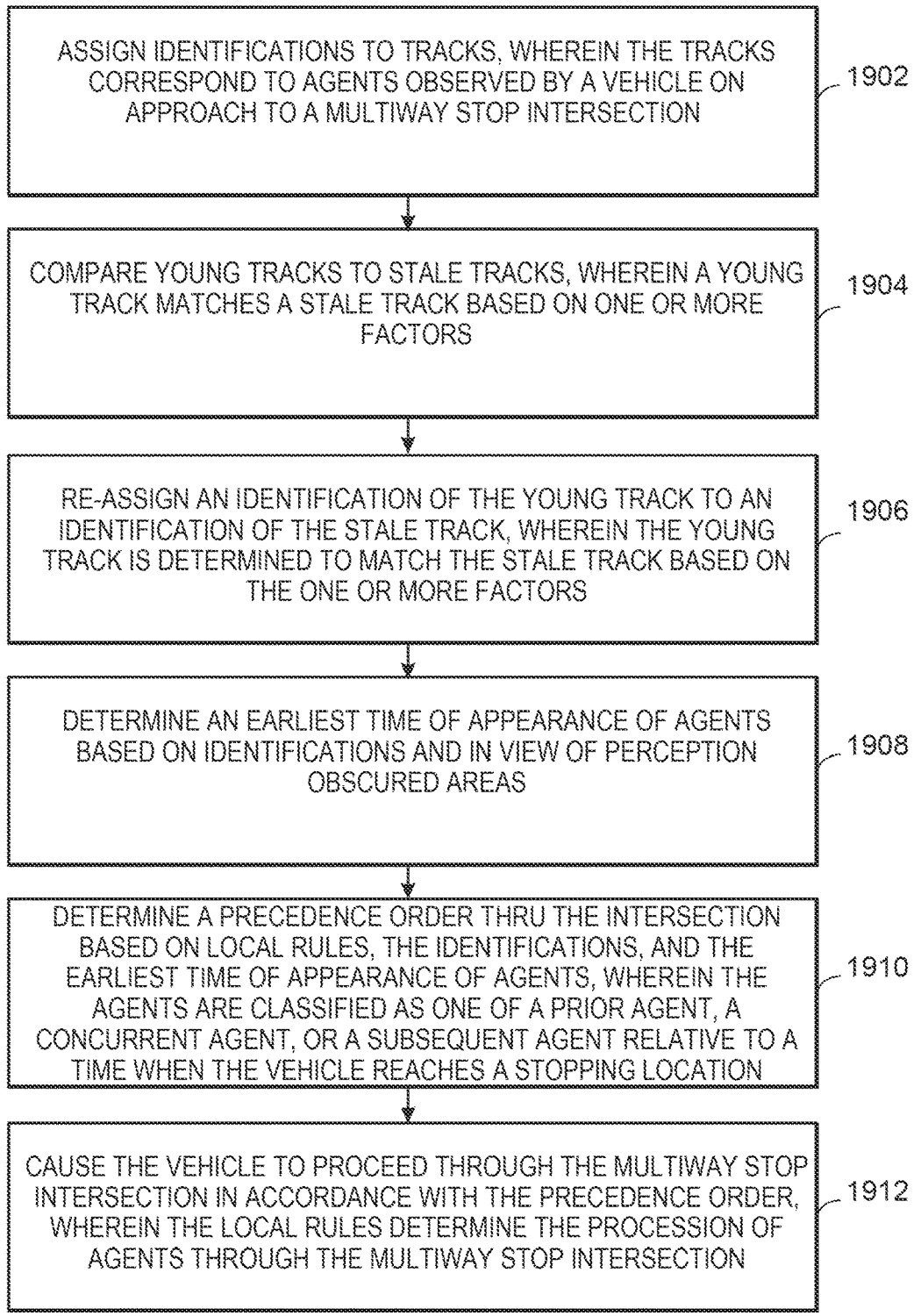
FIG. 19 is a process flow diagram of a process for precedence order determination.

FIG. 19 is a process flow diagram for precedence order determination.

At block 1902, identifications are assigned to tracks. The tracks correspond to agents observed by a vehicle on approach to a multiway stop intersection. In examples, the intersection is where a plurality of roads cross, such as a multiway stop. At the multiway stop, the AV and agents generally comply with rules of the road to cross the intersection. In embodiments, an identification is assigned to a track of the at least one agent observed on approach to the intersection. For example, tracks are created from visually similar perception data and an identification is assigned to the newly observed tracks. In embodiments, the identification is an intermediate identification. In embodiments, the present techniques generate multiple IDs and/or some other representation for ID confusion as described below.

At block 1904, young tracks are compared to stale tracks. A young track matches a stale track based on one or more factors. In some embodiments, the factors comprise visual similarity, assumed agent dynamics, duration of lost observation, or any combinations thereof. Assumed agent dynamics can be determined using data captured by the AV, such as data captured by sensors 121 shown in FIG. 1, inputs 502a-d of FIG. 5, of any combinations thereof. Captured data associated with the agents can be used to determine agent dynamics, such as velocity, accelerations, decelerations, and steering angles associated with the agent.

In examples, a young track is a track associated with an agent that has a relatively short observation history. The agent associated with the young track has not been occluded or otherwise missing from observation within the AV field of view during the present precedence order determination at an intersection. A stale track is a track associated with an agent for which new observations have ceased (e.g., the agent is no longer observable by the vehicle.

At block 1906, an identification of the young track is re-assigned to an identification of the stale track, wherein the young track is determined to match the stale track based on the one or more factors. In some embodiments, the young track is determined to match the stale track in absolute terms, such that a match between a young track and a stale track is true or false (e.g., a Boolean value). In examples, if no match is found between a young track and the stale tracks, the young track is a new observation and a new identification is generated and assigned to the young track.

In some embodiments, ID confusion relates to an uncertainty in a confidence that a young track matches a stale track (if any). Matches between young tracks and stale tracks are described in terms of varying confidence levels of a match between multiple tracks. In an example with a young track and multiple stale tracks, matches are described in terms of a confidence level that indicates a probability of a match. For example, confidence levels can indicate a 30% confidence level that the young track is a match to a stale track A, 50% confidence level that the young track is a match to a stale track B, 0% confidence level that the young track is a match to a stale track C, and a 20% confidence level that the young track is a newly observed track. If the young track is likely a new track (e.g., a highest confidence level that the young track corresponds to a newly observed agent), the young track can be assigned a unique identification, such as "D." In the present example, the stale track B has a highest confidence level and the young track is a matched with stale track B. Additionally or alternatively, the confidence levels are used to determine a precedence order for navigation through an intersection. For example, a predetermined threshold is set to associate a young track with multiple identifications from stale tracks. Stale tracks with confidence levels above the predetermined threshold with respect to the young track are selected. For example, consider a predetermined threshold of greater than 30%. In the example of stale tracks A, B, and C, the young track is associated with both stale tracks A and B.

At block 1908, an earliest time of appearance of agents is determined based on identifications and in view of perception obscured areas. The identifications include assigned identifications and reassigned identifications. In examples, the earliest possible time of appearance of an agent at the intersection is based on collective intermediate and current identifications, also considering that young tracks emerging from a perception obscured area may have reached the intersection prior to the AV if and only if the stopping area has been obscured continuously for the duration from when the AV first reached a complete stop at the intersection until appearance of the young track. In some embodiments, a young track is associated with multiple stale tracks, such as when confidence levels are used to determine matches between young tracks and stale tracks. When a young track is associated with multiple stale tracks, an earliest time of arrival is the earliest time of observed arrival for the multiple stale tracks, historically. In the example of a young track that matches stale tracks A and B, the earliest time of appearance is the earliest time of appearance for either stale track A or stale track B.

At block 1910, a precedence order for navigation through the intersection is determined based on local rules, the assigned identifications, and the earliest time of appearance of agents. The agents are classified as one of a prior agent, a concurrent agent, or a subsequent agent relative to a time when the vehicle reaches a stopping location. The local rules include legislated rules, including first in, first out (FIFO), yield-to-the-right (YTR), and Straight, Near, Far, U-turn (SNFU). Local rules can also include generally agreed upon rules of the road.

At block 1912, the vehicle proceeds through the multiway stop intersection in accordance with the precedence order. The local rules determine the procession of agents through the multiway stop intersection. In examples, the AV is controlled to navigate through the intersection in accordance with the precedence order. In some embodiments, the precedence order is iteratively updated until the AV crosses the intersection. In examples, in response to an agent being classified as a concurrent agent, the AV proceeds through the multiway stop intersection in accordance with the local rules applicable to concurrent arrival at a multiway stop intersection. Additionally, in examples causing the vehicle to proceed through the multiway stop intersection in accordance with the precedence order comprises yielding to a hypothetical agent, wherein the hypothetical agent occupies a perception obscured area and is classified as a prior agent. Prior agents can navigate the intersection prior to the AV.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A vehicle, comprising:
   at least one computer-readable medium storing computer-executable instructions;
   at least one processor communicatively coupled to the at least one computer-readable medium and configured to execute the computer executable instructions, the execution carrying out operations including:
   assigning identifications to tracks, wherein the tracks correspond to agents observed by the vehicle on approach to a multiway stop intersection;
   re-assigning an identification of a young track to an identification of a stale track when the young track matches the stale track, wherein the young track is determined to match the stale track based on one or more factors;
   determining an earliest time of appearance of agents based on the identifications and in view of perception obscured areas, wherein the earliest time of appearance of agents is determined at a perception obscured area by observing that a first agent arrives at a respective stopping area of the multiway stop intersection prior to the vehicle, and the stopping area is obscured continuously for a period of time from when the vehicle first reaches its respective stopping area until an observation of a young track associated with the first agent;

determining a precedence order for navigation through the intersection based on local rules, the identifications, and the earliest time of appearance of agents, wherein the agents are classified as one of a prior agent, a concurrent agent, or a subsequent agent relative to a time when the vehicle reaches a stopping location; and causing the vehicle to proceed through the multiway stop intersection in accordance with the precedence order, wherein the local rules determine a procession of agents through the multiway stop intersection.

2. The vehicle of claim 1, wherein the factors evaluated to match the young track to the stale track comprise visual similarity, assumed agent dynamics, duration of lost observation, or any combinations thereof.

3. The vehicle of claim 1, wherein the young tracks correspond to agents with a relatively short observation history by the vehicle when compared to stale tracks, wherein stale tracks correspond to agents for which observations have ceased).

4. The vehicle of claim 1, wherein the operations comprise, in response to an agent being classified as a concurrent agent, causing the vehicle to proceed through the multiway stop intersection in accordance with the local rules applicable to concurrent arrival at a multiway stop intersection.

5. The vehicle of claim 1, wherein causing the vehicle to proceed through the multiway stop intersection in accordance with the precedence order comprises yielding to a hypothetical agent, wherein the hypothetical agent occupies a perception obscured area.

6. The vehicle of claim 1, wherein causing the vehicle to proceed through the multiway stop intersection comprises creeping forward to obtain additional data associated with the perception obscured areas.

7. The vehicle of claim 1, wherein the operations comprise assigning a higher precedence in the precedence order to a non-compliant agent, wherein the non-compliant agent is an agent executing a rolling stop.

8. The vehicle of claim 1, wherein a perception obscured area is an area within a field of view of the vehicle where perception data is unavailable.

9. A method, comprising:
assigning, with at least one processor, identifications to tracks, wherein the tracks correspond to agents observed by a vehicle on approach to a multiway stop intersection;

re-assigning, with the at least one processor, an identification of a young track to an identification of a stale track when the young track matches the stale track, wherein the young track is determined to match the stale track based on one or more factors;

determining, with the at least one processor, an earliest time of appearance of agents based on the identifications and in view of perception obscured areas, wherein the earliest time of appearance of agents is determined at a perception obscured area by observing that a first agent arrives at a respective stopping area of the multiway stop intersection prior to the vehicle, and the stopping area is obscured continuously for a period of time from when the vehicle first reaches its respective stopping area until an observation of a young track associated with the first agent;

determining, with the at least one processor, a precedence order for navigation through the intersection based on local rules, the identifications, and the earliest time of appearance of agents, wherein the agents are classified as one of a prior agent, a concurrent agent, or a subsequent agent relative to a time when the vehicle reaches a stopping location; and causing, with the at least one processor, the vehicle to proceed through the multiway stop intersection in accordance with the precedence order, wherein the local rules determine a procession of agents through the multiway stop intersection.

10. The method of claim 9, wherein the factors evaluated to match the young track to the stale track comprise visual similarity, assumed agent dynamics, duration of lost observation, or any combinations thereof.

11. The method of claim 9, wherein the young tracks correspond to agents with a relatively short observation history by the vehicle when compared to stale tracks, wherein stale tracks correspond to agents for which observations have ceased.

12. The method of claim 9, comprising, in response to the agent being classified as a concurrent agent, causing the vehicle to proceed through the multiway stop intersection in accordance with the local rules applicable to concurrent arrival at a multiway stop intersection.

13. The method of claim 9, wherein causing the vehicle to proceed through the multiway stop intersection in accordance with the precedence order comprises yielding to a hypothetical agent, wherein the hypothetical agent occupies a perception obscured area.

14. The method of claim 9, wherein causing the vehicle to proceed through the multiway stop intersection in accordance with the precedence order comprises creeping forward to obtain additional data associated with the perception obscured areas.

15. The method of claim 9, comprising assigning a higher precedence in the precedence order to a non-compliant agent, wherein the non-compliant agent is an agent executing a rolling stop.

16. The method of claim 9, wherein a perception obscured area is an area within a field of view of the vehicle where perception data is unavailable.

17. At least one non-transitory storage medium storing instructions that, when executed by at least one processor, cause the at least one processor to:
assign identifications to tracks, wherein the tracks correspond to agents observed by a vehicle on approach to a multiway stop intersection;

re-assign an identification of a young track to an identification of a stale track when the young track matches the stale track, wherein the young track is determined to match the stale track based on one or more factors;

determine an earliest time of appearance of agents based on the identifications and in view of perception obscured areas, wherein the earliest time of appearance of agents is determined at a perception obscured area by observing that a first agent arrives at a respective stopping area of the multiway stop intersection prior to the vehicle, and the stopping area is obscured continuously for a period of time from when the vehicle first reaches its respective stopping area until an observation of a young track associated with the first agent;

determine a precedence order for navigation through the intersection based on local rules, the identifications, and the earliest time of appearance of agents, wherein the agents are classified as one of a prior agent, a concurrent agent, or a subsequent agent relative to a time when the vehicle reaches a stopping location; and cause the vehicle to proceed through the multiway stop intersection in accordance with the precedence order, wherein the local rules determine a procession of agents through the multiway stop intersection.

18. The at least one non-transitory storage medium of claim 17, wherein the factors evaluated to match the young track to the stale track comprise visual similarity, assumed agent dynamics, duration of lost observation, or any combinations thereof.

19. The at least one non-transitory storage medium of claim 17, wherein the young tracks correspond to agents with a relatively short observation history by the vehicle when compared to stale tracks, wherein stale tracks correspond to agents for which observations have ceased.

* * * * *

UNITED STATES PATENT AND TRADEMARK OFFICE
CERTIFICATE OF CORRECTION

| | | |
|---|---|---|
| PATENT NO. | : 11,987,249 B2 | Page 1 of 1 |
| APPLICATION NO. | : 17/583769 | |
| DATED | : May 21, 2024 | |
| INVENTOR(S) | : Scott D. Pendleton et al. | |

It is certified that error appears in the above-identified patent and that said Letters Patent is hereby corrected as shown below:

In the Claims

Column 33, Line 27, In Claim 3, delete "ceased)." and insert -- ceased. --.

Signed and Sealed this
Sixteenth Day of July, 2024

Katherine Kelly Vidal
Director of the United States Patent and Trademark Office